US012455332B1

(12) United States Patent
Short, Jr. et al.

(10) Patent No.: US 12,455,332 B1
(45) Date of Patent: Oct. 28, 2025

(54) RF TRANSMIT AND RECEIVER ANTENNA DETECTOR SYSTEM

(71) Applicant: QUANTUM IP, LLC, Stuart, FL (US)

(72) Inventors: Robert J. Short, Jr., Stuart, FL (US); Lee Duke, Stuart, FL (US); John Cronin, Stuart, FL (US); Michael D'Andrea, Stuart, FL (US); Joseph Bodkin, Stuart, FL (US)

(73) Assignee: QUANTUM IP, LLC, Stuart, FL (US)

( * ) Notice: Subject to any disclaimer, the term of this patent is extended or adjusted under 35 U.S.C. 154(b) by 0 days.

(21) Appl. No.: 18/938,584

(22) Filed: Nov. 6, 2024

Related U.S. Application Data

(60) Provisional application No. 63/668,720, filed on Jul. 8, 2024.

(51) Int. Cl.
| G01R 33/44 | (2006.01) |
| G01R 33/24 | (2006.01) |
| G01R 33/46 | (2006.01) |

(52) U.S. Cl.
CPC ......... *G01R 33/443* (2013.01); *G01R 33/246* (2013.01); *G01R 33/46* (2013.01)

(58) Field of Classification Search
CPC .... G01R 33/443; G01R 33/246; G01R 33/46; G01N 24/00; G01N 29/04;
(Continued)

(56) References Cited

U.S. PATENT DOCUMENTS

| 2,116,717 A | 5/1938 | Hans |
| 3,725,917 A | 4/1973 | Sletten et al. |

(Continued)

FOREIGN PATENT DOCUMENTS

| CN | 107102325 | 8/2017 |
| CN | 117091456 | 11/2023 |

(Continued)

OTHER PUBLICATIONS

Takafumi et al.; Translation of JP 2014095625 A; Translated by Google & EPO (Year: 2014).*

(Continued)

*Primary Examiner* — Eman A Alkafawi
*Assistant Examiner* — Rahul Maini
(74) *Attorney, Agent, or Firm* — Polsinelli LLP

(57) ABSTRACT

Embodiments include a system for material detection and identification. The system may include an RF transmit device configured to transmit into an environment an RF signal at a resonance frequency. The system may also include an RF receiver device configured to receive a response signal from the environment. The system may further include a communication device connecting the RF transmit device and the RF receiver device. The communication device may include a control module. The system may include a geolocation device. The control module may be configured to receive geolocation data from the geolocation device, analyze the response signal for resonance characteristics that indicate a presence of a material, and identify the material to a user when the presence of the material is indicated by the resonance characteristics. Methods for material detection and identification are also described. Methods may involve obtaining geolocation data.

19 Claims, 7 Drawing Sheets

(58) Field of Classification Search
CPC ....... G01N 2291/014; G01N 2021/436; G01N 29/50; G01N 37/00
USPC ........................................................ 324/307
See application file for complete search history.

(56) References Cited

U.S. PATENT DOCUMENTS

| | | | |
|---|---|---|---|
| 3,983,558 A | 9/1976 | Rittenbach | |
| 4,132,943 A | 1/1979 | Gournay et al. | |
| 4,217,585 A | 8/1980 | Fishbein et al. | |
| 4,296,378 A | 10/1981 | King | |
| 4,514,691 A | 4/1985 | De Los Santos et al. | |
| 4,897,660 A | 1/1990 | Gold et al. | |
| 5,227,800 A | 7/1993 | Huguenin et al. | |
| 5,233,300 A | 8/1993 | Buess et al. | |
| 5,592,083 A | 1/1997 | Magnuson et al. | |
| 5,745,071 A | 4/1998 | Blackmon et al. | |
| 6,297,765 B1 * | 10/2001 | Frazier | G01S 13/003 342/147 |
| 6,359,582 B1 | 3/2002 | MacAleese et al. | |
| 6,967,612 B1 | 11/2005 | Gorman et al. | |
| 7,251,310 B2 | 7/2007 | Smith | |
| 7,288,927 B2 | 10/2007 | Nutting et al. | |
| 7,405,692 B2 | 7/2008 | McMakin et al. | |
| 7,825,648 B2 | 11/2010 | Nutting et al. | |
| 8,138,770 B2 | 3/2012 | Pechmann et al. | |
| 8,188,862 B1 | 5/2012 | Tam et al. | |
| 8,242,447 B1 | 8/2012 | Chawla | |
| 8,242,450 B2 | 8/2012 | Gaziano | |
| 8,502,666 B1 | 8/2013 | Tam et al. | |
| 8,890,745 B2 | 11/2014 | Wahlquist et al. | |
| 9,182,481 B2 | 11/2015 | Bowring et al. | |
| 9,500,609 B1 | 11/2016 | Zank | |
| 9,915,727 B1 | 3/2018 | Reznack et al. | |
| 10,204,775 B2 | 2/2019 | Brown et al. | |
| 10,229,328 B2 | 3/2019 | Nikolova et al. | |
| 10,268,889 B2 | 4/2019 | Brown et al. | |
| 10,816,658 B2 | 10/2020 | Frizzell | |
| 10,890,656 B2 | 1/2021 | Heinen | |
| 11,280,898 B2 | 3/2022 | Morton | |
| 11,422,252 B2 | 8/2022 | Bowring et al. | |
| 11,493,494 B2 | 11/2022 | Wilson et al. | |
| 12,248,062 B1 | 3/2025 | Short et al. | |
| 12,360,234 B1 | 7/2025 | Short et al. | |
| 12,372,480 B1 | 7/2025 | Short et al. | |
| 12,379,439 B1 | 8/2025 | Short et al. | |
| 12,386,037 B1 | 8/2025 | Short et al. | |
| 2002/0008655 A1 | 1/2002 | Haj-Yousef | |
| 2003/0196543 A1 | 10/2003 | Moser et al. | |
| 2004/0039713 A1 | 2/2004 | Beck | |
| 2004/0125020 A1 | 7/2004 | Hendler et al. | |
| 2004/0232054 A1 | 11/2004 | Brown et al. | |
| 2004/0252062 A1 | 12/2004 | Tracy et al. | |
| 2005/0081634 A1 | 4/2005 | Matsuzawa | |
| 2005/0200528 A1 | 9/2005 | Carrender et al. | |
| 2005/0230604 A1 | 10/2005 | Rowe et al. | |
| 2006/0008051 A1 | 1/2006 | Heaton et al. | |
| 2006/0038563 A1 | 2/2006 | Chrisholm et al. | |
| 2007/0074580 A1 | 4/2007 | Fallah-Rad et al. | |
| 2007/0115183 A1 | 5/2007 | Kim et al. | |
| 2007/0188377 A1 * | 8/2007 | Krikorian | G01S 13/003 342/126 |
| 2008/0283761 A1 | 11/2008 | Robinson et al. | |
| 2009/0085565 A1 | 4/2009 | Fullerton | |
| 2009/0195435 A1 | 8/2009 | Kapilevich et al. | |
| 2009/0262005 A1 | 10/2009 | McNeill et al. | |
| 2010/0046704 A1 | 2/2010 | Song et al. | |
| 2010/0079280 A1 | 4/2010 | Lacaze et al. | |
| 2010/0128852 A1 | 5/2010 | Yamamoto et al. | |
| 2010/0134102 A1 | 6/2010 | Crowley | |
| 2010/0134254 A1 | 6/2010 | Kim | |
| 2010/0164831 A1 | 7/2010 | Rentz et al. | |
| 2010/0182594 A1 | 7/2010 | Carron | |
| 2011/0050241 A1 | 3/2011 | Nutting et al. | |
| 2011/0233419 A1 | 9/2011 | Norris | |
| 2011/0284742 A1 | 11/2011 | Barker et al. | |
| 2012/0248313 A1 | 10/2012 | Karam et al. | |
| 2012/0256779 A1 | 10/2012 | Nguyen et al. | |
| 2015/0160181 A1 | 6/2015 | White et al. | |
| 2016/0011307 A1 | 1/2016 | Casse et al. | |
| 2016/0047757 A1 | 2/2016 | Kuznetsov et al. | |
| 2016/0124071 A1 | 5/2016 | Baxley et al. | |
| 2016/0166843 A1 | 6/2016 | Casse et al. | |
| 2016/0195608 A1 | 7/2016 | Ruenz | |
| 2016/0223666 A1 | 8/2016 | Kim et al. | |
| 2016/0274230 A1 | 9/2016 | Wu et al. | |
| 2016/0327634 A1 | 11/2016 | Katz et al. | |
| 2017/0011255 A1 | 1/2017 | Kaditz et al. | |
| 2017/0350834 A1 | 12/2017 | Prado et al. | |
| 2018/0067204 A1 | 3/2018 | Frizzell | |
| 2018/0285640 A1 | 10/2018 | Brown et al. | |
| 2019/0137653 A1 | 5/2019 | Starr et al. | |
| 2019/0154439 A1 | 5/2019 | Binder | |
| 2019/0208112 A1 | 7/2019 | Kleinbeck | |
| 2019/0219687 A1 | 7/2019 | Baheti et al. | |
| 2019/0257771 A1 | 8/2019 | Desmulliez et al. | |
| 2020/0166634 A1 | 5/2020 | Peleg | |
| 2020/0173970 A1 | 6/2020 | Wilson et al. | |
| 2020/0264298 A1 | 8/2020 | Haseltine et al. | |
| 2020/0333412 A1 | 10/2020 | Nichols et al. | |
| 2020/0371227 A1 | 11/2020 | Malhi | |
| 2021/0041376 A1 | 2/2021 | Ashiwal et al. | |
| 2021/0096240 A1 | 4/2021 | Padmanabhan et al. | |
| 2021/0312201 A1 | 10/2021 | Hastings et al. | |
| 2021/0373098 A1 | 12/2021 | Fraundorfer et al. | |
| 2022/0171017 A1 | 6/2022 | McFadden et al. | |
| 2022/0265882 A1 | 8/2022 | Lemchen | |
| 2022/0311135 A1 | 9/2022 | Guo et al. | |
| 2022/0365168 A1 * | 11/2022 | Amizur | G01S 13/003 |
| 2022/0408643 A1 | 12/2022 | Somarowthu et al. | |
| 2023/0243761 A1 | 8/2023 | Somarowthu et al. | |
| 2023/0375695 A1 | 11/2023 | Tan | |
| 2024/0036166 A1 | 2/2024 | Geng et al. | |
| 2024/0372600 A1 | 11/2024 | Schreck et al. | |

FOREIGN PATENT DOCUMENTS

| | | | | |
|---|---|---|---|---|
| JP | 2014095625 A | * | 5/2014 | |
| WO | WO-2024091157 A1 | * | 5/2024 | G01S 13/56 |

OTHER PUBLICATIONS

PCT Application No. PCT/US2024/039348, International Search Report and Written Opinion dated Oct. 17, 2024.

U.S. Appl. No. 18/922,693, Non-Final Office Action dated Nov. 26, 2024.

U.S. Appl. No. 18/922,729, Non-Final Office Action dated Dec. 16, 2024.

U.S. Appl. No. 18/929,189, Non-Final Office Action dated Jan. 24, 2025.

U.S. Appl. No. 18/782,964, Non-Final Office Action dated Dec. 6, 2024.

U.S. Appl. No. 18/939,132, Non-Final Office Action dated Dec. 26, 2024.

U.S. Appl. No. 18/936,177, Non-Final Office Action dated Jan. 21, 2025.

U.S. Appl. No. 18/936,500, Non-Final Office Action dated Dec. 23, 2024.

U.S. Appl. No. 18/946,014, Non-Final Office Action dated Jan. 16, 2025.

Erricolo et al., "Machine Learning in Electromagnetics: A Review and Some Perspectives for Future Research," 2019 International Conference on Electromagnetics in Advanced Applications (ICEAA), Granada, Spain, 2019, pp. 1377-1380, doi: 10.1109/ICEAA.2019.8879110.

Ibrahim et al., "A Subspace Signal Processing Technique for Concealed Weapons Detection," 2007 IEEE International Conference on Acoustics, Speech and Signal Processing—ICASSP '07, Honolulu, HI, USA, pp. II-401-II-404, doi: 10.1109/ICASSP.2007.366257, 2007.

(56) References Cited

OTHER PUBLICATIONS

Itozaki et al., "Nuclear Quadrupole Resonance for Explosive Detection," International Journal on Smart Sensing and Intelligent Systems, vol. 1, No. 3, Sep. 2008.
U.S. Appl. No. 18/921,840, Robert J. Short Jr., RF-Based Material Detection Device That Uses Specific Antennas Designed for Specific Substances, Oct. 21, 2024.
U.S. Appl. No. 18/922,682, Robert J. Short Jr., Enhanced Antenna Materials for Low-Frequency Detection of Materials, Oct. 22, 2024.
U.S. Appl. No. 18/922,693, Robert J. Short Jr., Dynamic Phased Array Resonator Systems and Methods for Determining a Material Sub Stance, Oct. 22, 2024.
U.S. Appl. No. 18/923,518, Robert J. Short Jr., Currency RF-Based Erification Device, Oct, 22, 2024.
U.S. Appl. No. 18/922,702, Robert J. Short Jr., Enhanced Material Detection and Frequency Sweep Nalysis of Controlled Substances via Digital Signal Processing, Oct. 22, 2024.
U.S. Appl. No. 18/922,729, Robert J. Short Jr., RF-Based Detection Device for Material Identification Using a Smart Frequency Selection Method, Oct. 22, 2024.
U.S. Appl. No. 18/929,189, Robert J. Short Jr., RF-Specific Material Detection Device for an Application-Specific Device, Oct. 28, 2024.
U.S. Appl. No. 18/782,964, Robert J. Short Jr., RF-Based Material Identification Systems and Methods, Jul. 24, 2024.
PCT/US2024/039348, Robert J. Short, Jr. RF-Based Material Identification Systems and Methods, Jul. 24, 2024.
U.S. Appl. No. 18/934,569, Robert J. Short Jr., Networked RF Material Devices for Substance Detection via Opposed Perimeter Sensors, Nov. 1, 2024.
U.S. Appl. No. 18/939,132, Robert J. Short Jr., RF Material Detection Device With Smart Scanning Multiple Axis Gimbal Integrated With Haptics, Nov. 6, 2024.
U.S. Appl. No. 18/936,177, Robert J. Short Jr., Method and System for Detecting and Quantifying Specific Substances, Elements, or Conditions Utilizing an AI Module, Nov. 4, 2024.
U.S. Appl. No. 18/942,906, Robert J. Short Jr., RF-Specific Material Detection Device Integrated Into Application-Specific Drone Device, Nov. 11, 2024.
U.S. Appl. No. 18/936,500, Robert J. Short Jr., RF-Based Special Material Detection System With Secure Multi-Dimensional Authentication, Nov. 4, 2024.
U.S. Appl. No. 18/938,691, Robert J. Short Jr., RF-Based AI Determination of Materials by Cycling Through Detection Patterns for Specific Pplications, Nov. 6, 2024.
U.S. Appl. No. 18/946,014, Robert J. Short, Jr., RF-Based Special Material Detection Securing Entry Points and Access, Nov. 13, 2024.
U.S. Appl. No. 18/921,840, Non-Final Office Action dated Feb. 28, 2025.
U.S. Appl. No. 18/922,693, Final Office Action dated Mar. 17, 2025.
PCT Application No. PCT/US2025/036318, International Search Report and Written Opinion dated Aug. 26, 2025.
U.S. Appl. No. 18/922,693, Non-Final Office Action dated Jun. 4, 2025.
U.S. Appl. No. 18/929,189, Final Office Action dated Jun. 23, 2025.
U.S. Appl. No. 19/268,204, Non-Final Office Action dated Aug. 13, 2025.
U.S. Appl. No. 19/279,049, Non-Final Office Action dated Aug. 22, 2025.

* cited by examiner

RF TRANSMIT AND RECEIVER ANTENNA DETECTOR SYSTEM

CROSS-REFERENCE TO RELATED APPLICATION

This application claims the benefit of U.S. Provisional Application No. 63/668,720, filed Jul. 8, 2024, for AN RF TRANSMIT AND RECEIVER ANTENNA DETECTOR SYSTEM, which is incorporated herein by reference.

FIELD OF THE DISCLOSURE

The present disclosure is generally related to an RF transmit and receive antenna detector system.

BACKGROUND

Current RF detection systems often suffer from low accuracy due to the limitations of using a single transmit and receive antenna. This results in false positives or missed detections, especially in complex environments where signal interference is common. Traditional methods for locating specific materials lack the precision required for accurate geolocation. They often fail to provide exact coordinates, making it difficult to pinpoint the material's location, especially in dynamic or cluttered environments. Also, synchronizing and coordinating multiple RF devices in real time is challenging. Without an effective central communication device, the data from various antennas cannot be accurately synchronized, leading to inconsistencies and errors in detection and location determination. Interference from overlapping signals is a significant problem in RF detection systems. When multiple devices operate simultaneously, distinguishing between signals from different sources becomes difficult, leading to erroneous readings. Lastly, many RF detection systems are not scalable and lack flexibility. They are often designed for specific applications and cannot be easily adapted to different scenarios or expanded to cover larger areas or multiple types of materials. Integrating data from multiple sources, including RF transmitters, receivers, and geolocation devices, is complex. Without a robust processing module and a well-structured database, managing and analyzing this data to detect and locate materials accurately is a daunting task. Thus, there is a need for an RF transmit and receive antenna detector system.

SUMMARY

A system for detecting substances using separate receive and transmit antennas, employing a common magnetic ground, enhances the specificity and sensitivity of the detection. The device's ability to tune to specific substances and detect their presence and location relies on capturing the unique resonance response.

In some aspects, the embodiments described herein relate to a system for material detection and identification, the system including: an RF transmit device configured to transmit into an environment an RF signal at a resonance frequency; an RF receiver device configured to receive a response signal from the environment; a communication device connecting the RF transmit device and the RF receiver device, the communication device including a control module; and a geolocation device. The control module may be configured to receive geolocation data from the geolocation device, analyze the response signal for resonance characteristics that indicate a presence of a material, and identify the material to a user when the presence of the material is indicated by the resonance characteristics.

In some aspects, the embodiments described herein relate to a system, where the geolocation device is a first geolocation device configured to provide geolocation data associated with transmitting the RF signal. The system may further include a second geolocation device configured to provide geolocation data associated with receiving the response signal.

In some aspects, the embodiments described herein relate to a system, where the communication device is configured to coordinate the RF transmit device and the RF receiver device to determine a location of the material.

In some aspects, the embodiments described herein relate to a system, where the communication device includes memory storing a material database associating each material of a plurality of materials with one or more corresponding resonance frequencies.

In some aspects, the embodiments described herein relate to a system, where the geolocation data includes time series data including locations at different points in time.

In some aspects, the embodiments described herein relate to a system, where the control module is further configured to determine a location of the material.

In some aspects, the embodiments described herein relate to a system, where the communication device includes memory storing the geolocation data and previous geolocation data.

In some aspects, the embodiments described herein relate to a system, further including a user interface configured to display locations of the RF transmit device, the RF receiver device, and the material.

In some aspects, the embodiments described herein relate to a system, further including a user interface configured to display a recommended location of the RF transmit device for determining a location of the material.

In some aspects, the techniques described herein relate to a method for material detection and identification, the method including: transmitting, using an RF transmit device, into an environment an RF signal at a resonance frequency; receiving, using an RF receiver device, a response signal from the environment; obtaining geolocation data of at least one of the RF transmit device and the RF receiver device; analyzing the response signal for resonance characteristics that indicate a presence of a material; identifying the material when the presence of the material is indicated by the resonance characteristics; and determining a location of the material using the geolocation data.

In some aspects, the techniques described herein relate to a method, where obtaining the geolocation data includes obtaining the geolocation data from the RF transmit device and the RF receiver device.

In some aspects, the techniques described herein relate to a method, further including: receiving first timestamp data of the transmitting, receiving second timestamp data of the receiving, and synchronizing transmission data from the RF transmit device with reception data from the RF receiver device using the first timestamp data and the second timestamp data.

In some aspects, the techniques described herein relate to a method, further including storing the geolocation data in memory.

In some aspects, the techniques described herein relate to a method, further including storing timestamp data of the RF signal and timestamp data of the response signal in the memory.

In some aspects, the techniques described herein relate to a method, where obtaining the geolocation data includes obtaining the geolocation data from the RF transmit device. The method may further include repositioning the RF transmit device to follow a pattern. Determining the location of the material uses additional data gathered from the RF transmit device following the pattern.

In some aspects, the techniques described herein relate to a method, where determining the location of the material uses triangulation.

In some aspects, the techniques described herein relate to a method, where obtaining the geolocation data includes obtaining the geolocation data from the RF receiver device at different points in time.

In some aspects, the techniques described herein relate to a method, where the RF transmit device is a first RF transmit device, the RF signal is a first RF signal, the geolocation data is a first geolocation data, and obtaining the geolocation data includes obtaining the geolocation data of the first RF transmit device. The method may further include obtaining second geolocation data of a second RF transmit device, and transmitting, using the second RF transmit device, into the environment a second RF signal. Determining the location of the material includes using the first geolocation data and the second geolocation data.

In some aspects, the techniques described herein relate to a method, further including: displaying, in a user interface, a dynamic geolocation map showing positions of the RF transmit device and the RF receiver device.

In some aspects, the techniques described herein relate to a method, further including: displaying, in a user interface, a dynamic geolocation map showing positions of detected materials.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
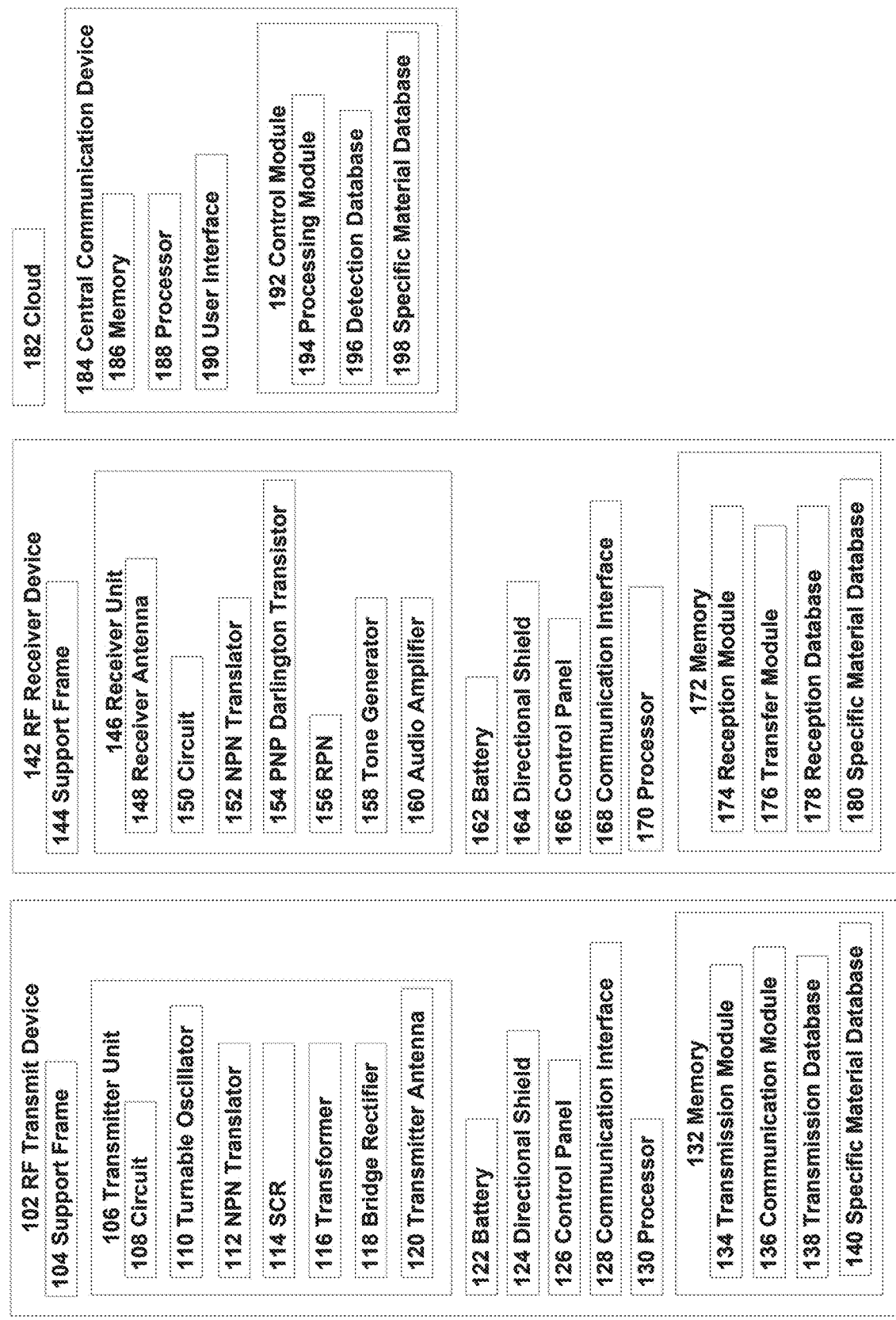
FIG. 1 illustrates an RF transmit and receiver antenna detector system according to an embodiment.

FIG. 1 illustrates an RF transmit and receiver antenna detector system. This system includes an RF transmit device 102, which may be designed to send out radio frequency signals for various applications, including the detection and localization of specific materials. The RF transmit device 102 may include a transmitter antenna 120 capable of transmitting signals across a range of frequencies, including low frequencies like 160 Hz. The transmitter antenna 120 may be paired with a directional shield 124 that focuses the transmission in a specific direction, enhancing the precision and effectiveness of the signal. In some embodiments, the RF transmit device 102 may include a geolocation component that uses GPS or similar technology to determine the exact location of the RF transmit device 102. The GPS may provide precise longitude and latitude coordinates to accurately map the position of detected materials. A control panel 126 may manage the transmission process and oversee frequency selection, modulation, and power control, ensuring that the RF transmit device 102 operates within the desired parameters. In some embodiments, the control panel 126 allows operators to set transmission parameters and monitor the status of the device in real time. A communications interface 128 within the RF transmit device 102 may facilitate data exchange with the central communication device 184 and other system components. The communication interface 128 provides that geolocation data, transmission status, and synchronization signals are accurately conveyed, enabling coordinated operations between the multiple devices. In some embodiments, the system may include a plurality of RF transmit devices 102 to provide additional transmission data to triangulate the precise location of a target material. In some embodiments, the system may include an RF transmit device 102 that is repositioned by the user during multiple transmissions to gather additional data to determine the location of the target material. In some embodiments, the RF transmit device 102 may be moved or re-located in a specific pattern, such as a circle, square, triangle, n-sided polygon, etc., to gather additional data on the target material and determine the target material's location. User interface (e.g., communications interface 128 or user interface 190) may display the recommended next location in the pattern to determine the target material's location.

Further, embodiments may include a support frame 104, which may be a structural component designed to provide stability and support to various subsystems and components of the RF transmit device 102. The support frame 104 may provide proper alignment and positioning of the components, such as the transmitter unit 106 and control panel 126. The support frame 104 may provide mounting points and secure attachment locations for subsystems such as the transmitter unit 106 and control panel 126. By maintaining precise alignment and stability, the support frame 104 may minimize vibrations and unwanted movements that could interfere with the accuracy of RF signal transmission. In some embodiments, the support frame 104 may be constructed from durable materials such as metal alloys or rigid polymers.

Further, embodiments may include a transmitter unit 106, which may include an electronic circuit 108, powered by a battery 122, such as a 12-volt, 1.2 amp battery, with a regulated output of nine volts. The circuit 108 may use a 555 timer as a tunable oscillator 110 to generate a pulse rate. The output of the oscillator 110 is fed in parallel to an NPN transistor 112 and a silicon-controlled rectifier or SCR 114. The transistor 112 may be used as a common emitter amplifier stage driving a transformer 116. The transformer 116 may be used to step up the voltage as needed. The balanced output of the transformer 116 feeds a bridge rectifier 118. The rectified direct current flows through a 100 K, three-watt resistor to terminal B of the transmitter antenna 120. A plurality of resistors and capacitors may fill in the circuit 108. In some embodiments, the transmitter antenna 120 may be formed from a coil of about 25 meters of 14-strand wire tightly wound around a one-centimeter PVC core. The transmitter antenna 120 may be, in one exemplary embodiment, in a 1"×3" configuration at the bottom end of the support frame 104. In some embodiments, the transmitter antenna 120 may be shielded approximately 315 degrees with the directional shield 124, formed from aluminum and copper, leaving a two-inch opening. Terminal A of the transmitter antenna 120 is switched to ground through the SCR 114. The SCR 114 is "fired" by the output of the 555 timer. This particular configuration may generate a narrow pulsed waveform to the transmitter antenna 120 at a pulse rate as set by the 555 timer. Power may be delivered through the 3 W resistor. Frequencies down to 4 Hz may be achieved by an RC network containing a 100 K pot, a switch, and one of two capacitive paths.

The circuit 108 may provide simple RC-controlled timing and deliver pulses to the primary of a step-up transformer 116, the output of which is full-wave rectified and fed to the transmitter antenna 120. The pulse rate is adjustable from the low Hz range to the low kHz range. The sharp pulses at low repetition frequencies yield a wide spectrum of closely spaced lines. The pulse rate is adjusted depending on the material to be detected. In some embodiments, one or more portions of the transmitter unit 106 may be implemented in an analog circuit configuration, a digital circuit configuration, or some combination thereof. In one example, the analog configuration may include one or more analog circuit components, such as, but not limited to, operational amplifiers, op-amps, resistors, inductors, and capacitors. In another example, the digital configuration may include one or more digital circuit components, such as, but not limited to, microprocessors, logic gates, and transistor-based switches. In some instances, a given logic gate may include one or more electronically controlled switches, such as transistors, and the output of a first logic gate may control one or more logic gates disposed "downstream" from the first logic gate.

Further, embodiments may include a circuit 108, which may be an assembly of electronic components that generate, modulate, and transmit radio frequency, RF, signals. The circuit 108 may include oscillators 110, amplifiers, modulators, and other components that work together to produce a specific RF signal, which can then be transmitted through the transmitter antenna 120. The circuit 108 may include an oscillator 110, which generates a stable RF signal at a specified frequency. This frequency is selected based on the resonance characteristics of the target material. For example, the system may operate at 180 Hz or 1800 Hz, depending on the detection task. Once generated, the RF signal is fed into an amplifier. The amplifier boosts the signal strength to a level suitable for transmission over the desired distance. This provides that the signal can propagate through various media and reach the RF receiver device 142 effectively. Modulation circuits are used to encode information into the RF signal. This may involve varying the amplitude, frequency, or phase of the signal to carry specific data related to the detection process. Modulation provides that the transmitted signal can be uniquely identified and distinguished from other signals in the environment. The circuit 108 may include power control components that regulate the voltage and current supplied to the oscillator 110 and amplifier. This provides consistent signal output and helps in managing the power consumption of the device. In some embodiments, the transmitter unit 106 may operate at voltages such as 160V and 320V, with adjustments made to optimize detection performance. The amplified and modulated RF signal is then routed to the transmitter antenna 120. The transmitter antenna 120 converts the electrical signal into an electromagnetic wave that can propagate through the air or other media. In some embodiments, the circuit 108 may be integrated with the device's control systems, allowing for automated adjustments based on pre-set parameters or operator inputs.

Further, embodiments may include a tunable oscillator 110, which may be a type of electronic component that generates a periodic waveform with a frequency that can be adjusted or tuned over a specific range. The tunable oscillator 110 within the transmitter unit 106 may be utilized to generate the RF signal that will be transmitted by the RF transmit device 102. The tunable oscillator 110 in the transmitter unit 106 may be employed to produce an RF signal whose frequency can be precisely controlled. By adjusting the control inputs, the frequency of the output signal can be varied, allowing the system to adapt to different detection scenarios and environmental conditions. This tuning mechanism may provide that the oscillator 110 produces a signal at the preferred frequency for effective resonance with the target materials. By tuning the oscillator 110 to specific frequencies, the system may detect various substances based on their unique resonant properties. The tunable oscillator 110 may work in conjunction with the control panel 126, which sends control signals to adjust the oscillator's 110 frequency as desired. The tunable oscillator 110 may act as the core signal generation component in the transmitter unit 106. When the control panel 126 determines the frequency for detection, it sends control signals to the tunable oscillator 110. The oscillator 110 then adjusts its frequency accordingly, generating an RF signal that matches the desired parameters. The tunable oscillator 110 may be connected to other components within the transmitter unit 106, such as the SCR 114 and the transformer 116. The SCR 114 manages the power supply to the oscillator 110, ensuring it receives the correct voltage. The transformer 116 steps up the voltage to the appropriate level for the oscillator 110.

Further, embodiments may include an NPN transistor 112, which may be a type of bipolar junction transistor, BJT, that includes three layers of semiconductor material: a layer of p-type material, the base layer, sandwiched between two layers of n-type material, the emitter and the collector. When a small current flows into the base, it allows a larger current to flow from the collector to the emitter, effectively acting as a current amplifier or switch in electronic circuits. The NPN transistor 112 in the transmitter unit 106 amplifies the RF signal generated by the oscillator 110. The NPN transistor 112 may operate in its active region, where a small input current applied to the base controls a larger current flowing from the collector to the emitter. This amplification process provides that the RF signal reaches a sufficient power level for effective transmission. In some embodiments, the NPN transistor 112 may also function as a switch, controlling the flow of current within the circuit 108. When the base-emitter junction is forward-biased, a small voltage is applied, and the NPN transistor 112 allows current to flow from the collector to the emitter. This switching action is used to modulate the RF signal, encoding information onto the carrier wave for the detection process. Proper biasing of the NPN transistor 112 is useful for stable operation. In some embodiments, resistors may be used to establish the correct biasing conditions to provide that the NPN transistor 112 operates in its linear region for amplification or in saturation/cutoff regions for switching. The biasing circuit provides that the NPN transistor 112 responds predictably to input signals, maintaining signal integrity. In some embodiments, the NPN transistor 112 may be involved in modulating the RF signal. By varying the input current to the base, the amplitude, frequency, or phase of the RF signal can be modulated. This modulation is useful for encoding the detection data onto the transmitted signal, allowing for accurate identification and analysis. In some embodiments, the NPN transistor 112 may be integrated into the broader transmitter circuit 108, working in conjunction with other components such as capacitors, inductors, and resistors. This integration provides that the NPN transistor's 112 amplification and switching actions are synchronized with the overall signal generation and transmission process. The circuit 108 design may leverage the NPN transistor's 112 properties to achieve the desired RF output characteristics.

Further, embodiments may include an SCR 114, or silicon-controlled rectifier, which may be a type of semiconductor device that functions as a switch and rectifier, allowing current to flow only when a control voltage is applied to its gate terminal. The SCR 114 is utilized within the transmitter unit 106 to manage and control the power delivery to the RF signal generation components. The SCR 114 in the transmitter unit 106 may be employed to control the flow of power to the RF oscillator 110 circuit 108. By applying a gate signal to the SCR 114, SCR 114 switches from a non-conductive state to a conductive state, allowing current to pass through and power the oscillator 110. This control mechanism provides that the oscillator 110 only receives power when desired, thereby conserving energy and preventing unnecessary power dissipation. The SCR 114 may act as a switching element in the transmitter unit 106. When the control panel 126 determines that the RF signal is to be generated, a gate voltage is applied to the SCR 114. This triggers the SCR 114 to conduct, completing the circuit and enabling current to flow to the RF oscillator 110. The SCR 114 may provide that sufficient current is supplied to the oscillator 110 to produce a strong RF signal without being damaged by the high power levels. The gate terminal of the SCR 114 may be connected to the control panel 126, which manages the timing and application of the gate signal. This integration provides that the SCR 114 is activated precisely when the RF signal is to be transmitted, in sync with the overall operation of the RF detection device 102. The control panel 126 sends the appropriate signal to the SCR 114, ensuring accurate timing and efficient power usage. The SCR 114 may also serve as a protective component in the transmitter unit 106. By controlling the power flow, SCR 114 prevents overloading and potential damage to the RF oscillator 110 and other sensitive components. If the system detects any abnormal conditions, the control panel 126 can withhold the gate signal, keeping the SCR 114 in a non-conductive state and thereby cutting off power to protect the circuit 108.

Further, embodiments may include a transformer 116, which is an electrical device that transfers electrical energy between two or more circuits through electromagnetic induction. The transformer 116 is utilized within the transmitter unit 106 to manage and control the voltage levels for the RF signal generation and transmission. The transformer 116 in the transmitter unit 106 may be employed to step up or down the voltage as desired to provide the proper operation of the RF oscillator 110 circuit 108. By adjusting the voltage levels, the transformer 116 provides that the components within the transmitter unit 106 receive the appropriate voltage for efficient functioning. The transformer 116 may act as a voltage regulation element in the transmitter unit 106. When the control panel 126 determines that the RF signal is to be generated, the transformer 116 adjusts the input voltage to the desired level. This adjustment involves converting the primary winding voltage to a higher or lower voltage in the secondary winding, depending on the RF oscillator 110. The transformer 116 provides that the oscillator 110 receives a stable and appropriate voltage, which is useful for producing a consistent and strong RF signal. The primary winding of the transformer 116 may be connected to the battery 122, while the secondary winding is connected to the RF oscillator circuit 110. This integration provides that the transformer 116 can effectively manage the voltage levels for RF signal generation. The control panel 126 monitors and regulates the input voltage to the transformer 116, ensuring accurate and efficient voltage conversion and delivery to the RF oscillator 110.

Further, embodiments may include a bridge rectifier 118, which is an electrical device designed to convert alternating current, AC, to direct current, DC, using a combination of four diodes arranged in a bridge configuration. The bridge rectifier 118 is utilized within the transmitter unit 106 to provide that the RF signal generation components receive a steady and reliable DC power supply. The bridge rectifier 118 in the transmitter unit 106 may be employed to convert the incoming AC voltage from the battery 122 into a DC voltage. By using all portions of the AC waveform, the bridge rectifier 118 provides full-wave rectification, resulting in a more efficient conversion process and producing a smoother and more stable DC output. The bridge rectifier 118 may act as a power conversion element in the transmitter unit 106. When the control panel 126 determines that the RF signal is to be generated, the AC voltage supplied to the transmitter unit 106 is passed through the bridge rectifier 118. The bridge rectifier 118 converts the AC voltage into a DC voltage by directing the positive and negative halves of the AC waveform through the appropriate diodes. This process results in a continuous DC voltage output that is used to power the RF oscillator 110 and other components. The input terminals of the bridge rectifier 118 may be connected to an AC power supply, while the output terminals provide the rectified DC voltage to the RF oscillator 110 and the circuit 108. This integration provides that the bridge rectifier 118 can effectively convert and deliver the DC power for RF signal generation. The control panel 126 monitors the output of the bridge rectifier 118, ensuring that the DC voltage is stable and within the desired range for optimal performance.

Further, embodiments may include a transmitter antenna 120, which may be a device that radiates radio frequency, RF, signals generated by the transmitter unit 106 towards a target material. The transmitter antenna 120 may be designed to efficiently transmit the generated RF signals into the surrounding environment and provide the signals reach the intended target with minimal loss. The transmitter antenna 120 may be responsible for the emission of RF signals for detecting materials at a distance. In some embodiments, the transmitter antenna 120 may operate within a specific frequency range suitable for detecting the atomic structures and characteristics of the target materials. The frequency range may be determined by the system and the properties of the materials being detected. In some embodiments, the gain of the transmitter antenna 120 may be a measure of its ability to direct the RF energy toward the target. Higher gain antennas focus the energy more effectively, resulting in stronger signal transmission over longer distances. The transmitter antenna 120 gain may be optimized for the operational frequency range. In some embodiments, the radiation pattern of the transmitter antenna 120 describes the distribution of radiated energy in space. For effective material detection, the transmitter antenna 120 may have a directional radiation pattern, concentrating the RF energy in a specific direction to enhance detection accuracy. In some embodiments, impedance matching between the transmitter antenna 120 and the transmitter unit 106 may maximize power transfer and minimize signal response. Proper impedance matching may provide efficient operation and reduce losses in the transmission path. In some embodiments, the physical design of the transmitter antenna 120 may include configurations such as dipole, patch, or horn antennas, depending on factors such as frequency range, gain, and environmental conditions. In some embodiments, the transmitter antenna 120 may be integrated with the transmitter unit 106 and other system components through connectors and mounting structures to provide stable and reliable operation, with considerations for minimizing interference and signal loss.

Further, embodiments may include a battery 122, which may be a type of energy storage device that provides a stable and portable power source for the RF transmit device 102, including the transmitter unit 106. The battery 122 may be utilized to supply the electrical energy to the various components involved in generating and transmitting the RF signal. The battery 122 may be designed to store electrical energy and supply it to the respective components. The battery 122 may be rechargeable or replaceable cells capable of providing DC voltage. They are selected based on factors such as voltage output and capacity, which may be measured in ampere-hours, Ah, and size to meet the power specifications of each component effectively. The battery 122 may serve as a portable power source, enabling the generation and transmission of RF signals without requiring a direct connection to an external power supply. The battery 122 may power useful components such as the oscillator 110 circuit 108, SCR 114, and transformer 116, ensuring continuous operation in various environmental conditions. In some embodiments, the battery 122 used may include lithium-ion, nickel-metal hydride, or other types suitable for portable electronic devices.

Further, embodiments may include a directional shield 124, which may be a physical barrier or enclosure designed to direct or block electromagnetic radiation in a specific direction. The directional shield 124 may be constructed from conductive materials such as metal to attenuate RF signals, thereby controlling the propagation of electromagnetic waves. The directional shield 124 may be positioned around the RF oscillator 110 and transmitter antenna 120 components. It may act as a physical barrier that prevents RF signals from propagating in undesired directions, thereby enhancing the precision and accuracy of signal transmission and reception. During operation, when the transmitter unit 106 generates an RF signal, the directional shield 124 helps to focus and channel this signal toward the intended detection area. By reducing signal dispersion, the directional shield 124 improves the efficiency of signal transmission.

Further, embodiments may include a control panel 126, which may be a centralized interface including electronic controls and displays. The control panel 126 may serve as the user-accessible interface for configuring, monitoring, and managing the RF transmit device's 102 operational parameters and data output. In some embodiments, the control panel 126 may be designed to provide operators with intuitive access to control and monitor various aspects of the RF transmit device 102. The control panel 126 may allow for the configuration of settings such as signal frequency, transmission power, etc. In some embodiments, operators may use the control panel 126 to initiate and terminate detection operations, adjust calibration settings, and troubleshoot operational issues. In some embodiments, input controls such as buttons, knobs, or touch-sensitive panels may enable operators to interact with the device, input commands, and navigate through menu options. The control panel 126 may interface directly with the internal electronics of the RF transmit device 102, including the transmitter unit 106, transmitter antenna 120, etc. Through electronic connections and communication protocols, the control panel 126 may send commands to adjust operational parameters and receive feedback and status updates from the RF transmit device 102. In some embodiments, the control panel 126 may be mounted on the support frame 104 and may provide an operator with control of the RF transmit device 102, including adjusting various settings. In some embodiments, a rechargeable battery 122 may power the RF transmit device 102, including the transmitter unit 106 and control panel 126. In some embodiments, multiple batteries may be used.

Further, embodiments may include a communication interface 128, which may be a hardware and software solution that enables data exchange between different systems or components within a network. The communication interface 128 may act as a bridge, facilitating the transfer of information by converting data into a format that can be transmitted and received by different devices. In some embodiments, the communication interface 128 may support various protocols and standards, such as Ethernet, Wi-Fi, Bluetooth, USB, and others, depending on the application. For example, an Ethernet interface may be used for wired network connections, providing reliable and high-speed data transfer. In some embodiments, a Wi-Fi interface may enable wireless connectivity, allowing the RF transmit device 102 to communicate with central communications device 184, RF receiver device 142, remote servers, mobile devices, or cloud-based applications without physical cables. In some embodiments, Bluetooth and USB interfaces may also be included for short-range wireless communication and direct data transfer, respectively. The communication interface 128 may transmit the transmission data from the transmitter unit 106 to external systems for further analysis, reporting, or storage. In some embodiments, the control panel 126 may package this data into suitable formats, such as JSON or XML. The communication interface 128 may then send this data over the network to a remote server or database, where it can be accessed by operators, analysts, or automated systems for further decision-making. In some embodiments, the communication interface 128 may provide remote monitoring and control of the RF transmit device 102. Operators may use a web-based interface or a mobile application to access real-time status updates and adjust configuration settings. For example, if the RF transmit device 102 is calibrated for a new target material, the configuration updates can be sent remotely through the communication interface 128, minimizing or reducing on-site adjustments. In some embodiments, the communication interface 128 may support alerting and notification functionalities.

Further, embodiments may include a processor 130, which may be responsible for executing instructions from programs and controlling the operation of other hardware components. The processor 130 may perform basic arithmetic, logic, control, and input/output (I/O) operations specified by the instructions in the programs. The processor 130 may operate by fetching instructions from memory 132, decoding them to determine the operation, executing the operations, and then storing the results. In some embodiments, the processor 130 may coordinate the overall system operations, manage communication between subsystems, and handle complex data analysis tasks. For example, when the RF transmit device 102 is powered on, the processor 130 may initiate a boot-up sequence that includes running diagnostics to check the status of all subsystems, such as the transmitter unit 106 and control panel 126. During this initialization phase, the processor 130 may that each component receives the voltage and current levels for operation. The processor 130 may also load predefined detection configurations and communicate with the transmitter unit 106 to configure their operating parameters based on the target material. In some embodiments, the processor 130 may handle user interface tasks, displaying system status indicators and receiving user inputs. The processor 130 may provide that the control panel 126 provides real-time feedback, such as green LED indicators for successful power-up and system readiness. In some embodiments, the processor 130 may manage data storage and logging, recording detection events and system performance metrics for future analysis.

Further, embodiments may include a memory 132, which may include suitable logic, circuitry, and/or interfaces that may be configured to store a machine code and/or a computer program with at least one code section executable by the processor 130. Examples of implementation of the memory 132 may include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. In some embodiments, the memory 132 may store configuration settings, signal patterns, and detection algorithms.

Further, embodiments may include a transmission module 134, which begins by connecting to the central communications device 184. The transmission module 134 continuously polls and receives the frequency data from the central communications device 184. The transmission module 134 sends a command to the transmitter unit 106 to configure the transmit signal and sends another command to the transmitter unit 106 to generate the transmit signal via the transmitter antenna 120. The transmission module 134 stores the transmission data in the transmission database 138, and the process returns to continuously polling for the frequency data from the central communications device 184.

Further, embodiments may include a communication module 136, which may continuously query the transmission database 138 for a new data entry. The communication module 136 extracts the new data entry stored in the transmission database 138 and connects to the central communications device 184. The communication module 136 sends the extracted transmission data from the transmission database 138 to the central communications database 184, and the process returns to querying the transmission database 138 for a new data entry.

Further, embodiments may include a transmission database 138, which may contain the data related to the transmission of the RF signal. The transmission database 138 may contain the received frequency from the central communication device 184, the target material from the central communication device 184, the transmitted frequency by the transmitter antenna 120, timestamps of the transmission, etc.

In some embodiments, the transmission database 138 may include detailed information about the frequency parameters, such as the frequency value, modulation type, and power level. In some embodiments, the transmission database 138 may include details such as the material's unique signature, the associated frequency range, and any other relevant detection parameters. In some embodiments, the transmission database 138 may include geolocation data, capturing the precise longitude and latitude coordinates of the RF transmit device 102 at various points in time.

Further, embodiments may include a specific material database 140, which may store and manage detailed information about various target materials. The specific material database 140 may be used to configure the detection parameters to identify specific materials based on their unique electromagnetic properties. Each entry in the database may be defined by the material's atomic structure, which includes the total number of protons and neutrons. The unique nuclear composition allows each substance to be distinctly identifiable and detectable through its resonant frequency. The specific material database 140 may contain a unique material ID, the common name of the material, the number of protons, the number of neutrons, and the atomic mass, which is the sum of protons and neutrons. The specific material database 140 may also contain calculated resonant frequencies based on the atomic characteristics. The resonant frequencies are useful for configuring the transmitter unit 106 of the RF transmit device 102, which sends out signals at these specific frequencies to induce a resonant response in the target material. For example, the specific material database 140 may contain an entry for Arsenic (As) with 33 protons and 42 neutrons, resulting in an atomic mass of 75. For illustrative purposes, the resonant frequencies for Arsenic could be 33 Hz, based on the number of protons, 42 Hz, based on the number of neutrons, and 75 Hz, based on the atomic mass. These frequencies may also be increased by orders of magnitude, such as 10× or 100×, to suit different detection environments. The resonant frequencies for different elements and compounds used may be determined by experiment. In some embodiments, for compounds, the specific material database 140 calculates a combined frequency based on the sum of the resonant frequencies of the constituent elements. For example, a formaldehyde molecule composed of 16 protons and 14 neutrons with a total atomic mass of 30 may have corresponding frequencies of 16 Hz, 14 Hz, and 30 Hz, respectively. Another example may be smokeless gunpowder, specifically nitroglycerin, with the chemical composition $CH_2NO_3CHNO_3CH_2NO_3$. The frequency for this compound may be calculated by summing the frequencies based on the atomic numbers of its constituent elements: 6 carbon+1×2 hydrogen+7 nitrogen+8×3 oxygen, repeated thrice, resulting in a total of 116 protons. This is then multiplied by 10 to yield a base frequency of 1160 Hz for detection purposes. In some embodiments, the specific material database 140 may account for overlapping frequencies among different elements and compounds.

Further, embodiments may include an RF receiver device 142, which may be designed to detect and process radio frequency signals emitted by a corresponding RF transmit device 102. The RF receiver device 142 may include a sensitive directional receiver antenna 148 capable of receiving signals over a wide frequency range, including the specific frequencies transmitted by the RF transmit device 102. The receiver antenna 148 may be designed to pick up even weak signals, making it ideal for applications where precise detection of specific materials is desired. In some embodiments, the RF receiver device 142 may include a geolocation component, such as a GPS or similar technology, to determine the exact position of the RF receiver device 142 at any given time, providing longitude and latitude coordinates. The RF receiver device 142 may also include a receiver unit 146, which enhances the received signal by reducing noise and improving clarity. The receiver unit 146 may incorporate low-noise amplifiers and other circuit enhancements that allow the receiver antenna 148 to detect very faint signals that might otherwise be lost. In some embodiments, a control panel 166 may manage the reception process, including tuning to the desired frequency, adjusting the gain, and filtering out unwanted signals. The control panel 166 may allow operators to configure settings and monitor the status of the RF receiver device 142 in real time. In some embodiments, the RF receiver device 142 may include a communications interface 168, which facilitates data exchange with the central communications device 184 and other system components. The communication interface 168 may provide that the geolocation data, signal strength, and other relevant information are accurately communicated, enabling coordinated operations and precise triangulation. In some embodiments, the system may include a plurality of RF receiver devices 142 to provide additional transmission data to triangulate the precise location of a target material. In some embodiments, the system may include an RF receiver device 142 that is repositioned by the user during multiple transmissions to gather additional data to determine the location of the target material. In some embodiments, the RF receiver device 142 may be moved or re-located in a specific pattern, such as a circle, square, triangle, etc., to gather additional data on the target material and determine the target material's location.

Further, embodiments may include a support frame 144, which may be a structural component designed to provide stability and support to various subsystems and components of the RF receiver device 142. The support frame 144 may provide proper alignment and positioning of the components, such as the receiver unit 146 and control panel 166. The support frame 144 may provide mounting points and secure attachment locations for subsystems such as the receiver unit 146 and control panel 166. By maintaining precise alignment and stability, the support frame 144 may minimize vibrations and unwanted movements that could interfere with the accuracy of RF signal reception. In some embodiments, the support frame 144 may be constructed from durable materials such as metal alloys or rigid polymers.

Further, embodiments may include a receiver unit 146, which may include the electronic circuit 150. Voltage from the receiver antenna 148 passes through a 10 K gain pot to an NPN transistor 152 used as a common emitter. The output is capacitively coupled to a PNP Darlington transistor 154. A plurality of resistors and capacitors fills in the circuit 150. The output is fed through an RPN 156 to a 555 timer that is used as a voltage-controlled oscillator. A received signal of a given amplitude may be stored in the reception database 178 and the data may be sent to the central communications device 184 for further processing and to notify the user or operator. In some embodiments, a received signal of a given amplitude may generate an audible tone at a given frequency. In some embodiments, the output is fed to a tone generator 158, such as a speaker, via a standard 386 audio amp. Sounds can be categorized as "grunts," "whines," and a particular form of whine with a higher harmonic notably present. In some embodiments, another indicator of a received signal is used, such as light, vibration, digital display, or analog display, in alternative to or in combination with the sound signal. A battery 162 may be used to power the receiver circuit 150. The receiver circuit 150 may utilize a coherent, direct-conversion mixer, homodyne, with RF gain, yielding a baseband signal centered about DC. After a baseband gain stage, the baseband signal is fed to another timing circuit that functions as a voltage-controlled audio-frequency oscillator. The output of this oscillator is amplified and may be fed to a speaker. In some embodiments, one or more portions of the receiver unit 146 may be implemented in an analog circuit configuration, a digital circuit configuration, or some combination thereof. In one example, the analog configuration may include one or more analog circuit components, such as, but not limited to, operational amplifiers 160, op-amps, resistors, inductors, and capacitors. In another example, the digital configuration may include one or more digital circuit components, such as, but not limited to, microprocessors, logic gates, and transistor-based switches. In some instances, a given logic gate may include one or more electronically controlled switches, such as transistors, and the output of a first logic gate may control one or more logic gates disposed "downstream" from the first logic gate.

Further, embodiments may include a receiver antenna 148, which may be a device that captures the radio frequency, RF, signals responded from a target material. The receiver antenna 148 may be designed to efficiently receive the responded RF signals and transmit them to the receiver unit 146 for further processing and analysis. The receiver antenna 148 may be responsible for capturing the RF signals that have interacted with the target material. In some embodiments, the receiver antenna 148 may be designed to operate within the same frequency range as the transmitter antenna 120 in the RF transmit device 102 to provide compatibility and optimal performance for detecting the atomic structures and characteristics of the target materials. In some embodiments, the sensitivity may be a measurement of the receiver antenna's 148 ability to detect weak signals. A highly sensitive receiver antenna 148 may detect low-power responded signals, enhancing the system's detection capabilities. In some embodiments, the noise figure of the receiver antenna 148 may indicate the level of noise it introduces into the received signal. A lower noise figure may be desirable as it provides that the captured signals are as clean and strong as possible for accurate processing. In some embodiments, proper impedance matching between the receiver antenna 148 and the receiver unit 146 may minimize signal response and maximize the power transfer from the receiver antenna 148 to the processing unit to provide efficient and accurate signal reception. In some embodiments, the directional properties of the receiver antenna 148 may determine its ability to capture signals from specific directions to distinguish signals responded from the target material versus other sources of interference. In some embodiments, the gain of the receiver antenna 148 may enhance its ability to receive signals from distant targets. Higher gain receiver antennas 148 can improve the system's ability to detect materials at greater distances. In some embodiments, the physical design of the receiver antenna 148 may include various configurations such as dipole, patch, or parabolic antennas and may be based on factors such as frequency range, gain, and the specific detection scenario. In some embodiments, the receiver antenna 148 may be integrated with the receiver unit 146 and other system components through connectors and mounting structures to provide stable and reliable operation, with considerations for minimizing interference and signal loss.

Further, embodiments may include a circuit 150 within the receiver unit 146, which may be an assembly of electrical components designed to process the received RF signal. The circuit 150 may accurately interpret the RF signals responded or emitted from the target substances and convert them into data that can be analyzed by the RF receiver device 142. The circuit 150 in the receiver unit 148 may be employed to handle signal amplification, filtering, demodulation, and signal processing. When an RF signal is received via the receiver antenna 148, it is typically weak and may contain noise or interference. The first stage of the circuit 150 may involve an amplifier that boosts the signal strength to a level suitable for further processing. This amplification provides that even weak signals can be analyzed effectively. Next, the circuit 150 may include filtering components that serve to remove unwanted frequencies and noise from the received signal. Filters provide that only the relevant frequency components of the RF signal are passed through, enhancing the signal-to-noise ratio and improving the clarity of the data. The circuit 150 may also incorporate a demodulator, which extracts the original information-bearing signal from the modulated RF carrier wave. This step interprets the data encoded in the RF signal, allowing the system to identify specific characteristics or signatures of the target substances. In some embodiments, the circuit 150 may include various signal processing components, such as analog-to-digital converters, ADCs, which convert the analog RF signal into digital data. This digital data may then be processed by the control panel 166 or other computational units within the system for detailed analysis. The signal processing may involve algorithms to detect specific patterns, frequencies, or anomalies that indicate the presence of target materials. The components within the circuit 150 interact seamlessly to provide accurate and efficient signal processing. For example, the amplified signal from the amplifier is passed to the filter, which cleans up the signal before it reaches the demodulator. The demodulated signal is then digitized by the ADC and sent to the control panel 166 for analysis.

Further, embodiments may include an NPN transistor 152, which may be a three-terminal semiconductor device used for amplification and switching of electrical signals. The NPN transistor 152 may include three layers of semiconductor material: a thin middle layer, or base, between two heavily doped layers, or emitter and collector. The NPN transistor 152 operates by controlling the flow of current from the collector to the emitter, regulated by the voltage applied to the base terminal. The NPN transistor 152 integrated into the receiver unit 146 may be designed to process incoming RF signals and may operate in a configuration where the base-emitter junction is forward-biased by a small control voltage, provided by preceding stages of the circuit 150. The collector of the NPN transistor 152 may be connected to the circuit's 150 supply voltage through a load resistor. When a small current flows into the base terminal, it allows a larger current to flow from the collector to the emitter. This amplification process increases the strength of the received signal, enabling subsequent stages of the circuit 150 to process it more effectively. In the receiver unit 146, the NPN transistor 152 may be employed within amplifier stages where signal gain is crucial. By controlling the base current, the circuit 150 can modulate the NPN transistor's 152 conductivity and thereby regulate the amplification factor. This capability enhances weak RF signals received by the receiver antenna 148 and prepares them for further processing. In some embodiments, the NPN transistor 152 may be utilized in conjunction with capacitors and resistors to form amplifier circuits tailored to the RF receiver device 142. Capacitors may be used to couple AC signals while blocking DC components, ensuring that only the RF signal is amplified. Resistors set the biasing and operating points of the transistor, optimizing its performance within the circuit 150.

Further, embodiments may include a PNP Darlington transistor 154, which may be a semiconductor device including of two PNP transistors 154 connected in a configuration that provides high current gain. The PNP Darlington transistor 154 integrates two stages of amplification in a single package, where the output of the first transistor acts as the input to the second, significantly boosting the overall gain of the circuit 150. The PNP Darlington transistor 154 amplifies weak RF signals received by the receiver antenna 148. The incoming RF signal is fed into the base of the first PNP transistor 154 within the Darlington pair. The PNP Darlington transistor 154, due to its high current gain, allows a much larger current to flow from its collector to emitter compared to the base current. The output from the collector of the first transistor serves as the input to the base of the second PNP transistor 154 in the Darlington pair. The second PNP transistor 154 further amplifies the signal received from the first stage, again with significant current gain.

Further, embodiments may include an RPN 156 or resistor potentiometer network, which may be an electrical circuit composed of resistors and potentiometers interconnected in a specific configuration to achieve desired electrical characteristics, such as voltage division, signal attenuation, or adjustment of resistance values. Potentiometers, also known as variable resistors, allow for manual adjustment of resistance within the circuit, while resistors set fixed values to control current flow and voltage levels. The RPN 156 in the receiver unit 146 may be configured to adjust signal levels received from the receiver antenna 148 and prepare them for further processing. The RPN 156 includes resistors and potentiometers connected to achieve precise voltage division and attenuation. By adjusting the potentiometers, operators can fine-tune the signal strength and impedance matching, optimizing signal quality for subsequent stages of signal processing. The RPN 156 provides that incoming RF signals from the receiver antenna 148 are properly attenuated and scaled to match the input specifications of downstream electronics. This calibration process maintains signal integrity and fidelity throughout the reception and decoding process. In some embodiments, the potentiometers within the RPN 156 may allow for manual adjustment of signal parameters such as amplitude and impedance, enabling operators to optimize signal reception based on environmental conditions and operational scenarios.

Further, embodiments may include a tone generator 158, which may be a type of electronic device that produces audio signals or tones to alert the user of specific conditions. The tone generator 158 within the receiver unit 148 may be utilized to generate audible alerts when the RF receiver device 142 identifies the presence of target materials. The tone generator 158 in the receiver unit 146 may be employed to create specific tones that serve as audible indicators for the user. By generating these tones, the tone generator 158 provides immediate feedback to the operator, signaling the detection of target materials in real time. The tone generator 158 may provide that the operator is promptly informed of detections without constantly monitoring visual displays. The tone generator 158 produces distinct sounds that correspond to different detection events, making it easier for the operator to understand the system's status and respond accordingly. The tone generator 158 may act as an alerting component within the receiver unit 146. When the control panel 166 determines that the RF signal corresponds to a detected target material, it sends a signal to the tone generator 158. This triggers the tone generator 158 to produce a sound, alerting the operator to the detection event.

Further, embodiments may include an audio amplifier 160, which may be a type of electronic device designed to increase the amplitude of audio signals. The audio amplifier 160 within the receiver unit 146 may be utilized to boost the audio signals generated by the tone generator 158, ensuring that the output sound is sufficiently loud and clear for the operator to hear. The audio amplifier 160 in the receiver unit 146 may be employed to enhance the volume and clarity of the audio tones produced by the tone generator 158. By amplifying these audio signals, the audio amplifier 160 provides that the operator receives audible alerts even in noisy environments, thus improving the overall effectiveness of the detection system. The audio amplifier 160 may act as an intermediary component between the tone generator 158 and the output device, such as a speaker. When the tone generator 158 produces an audio signal, this signal is sent to the audio amplifier 160. The audio amplifier 160 then boosts the signal's power, making it strong enough to drive the speaker and produce an audible sound. The audio amplifier 160 is connected to other components within the receiver unit 146, including the tone generator 158 and the speaker. It receives the low-power audio signals from the tone generator 158 and amplifies them to a level suitable for driving the speaker.

Further, embodiments may include a battery 162, which may be a type of energy storage device that provides a stable and portable power source for the RF receiver device 142. The battery 162 within the RF receiver device 142 may be utilized to supply the electrical energy to the various components involved in receiving the RF signal. The battery 162 may be designed to store electrical energy and supply it to the respective components. The battery 162 may be rechargeable or replaceable cells capable of providing DC voltage. They are selected based on factors such as voltage output and capacity, which may be measured in ampere-hours, Ah, and size to meet the power specifications of each component effectively. The batteries 162 may provide the electrical energy to receive and process RF signals detected by the receiver antenna 148. The battery 162 may power components such as amplifiers 160, filters, and signal processing circuitry, enabling the device to analyze incoming RF signals and extract relevant information. In some embodiments, the battery 162 may include lithium-ion, nickel-metal hydride, or other types suitable for portable electronic devices.

Further, embodiments may include a directional shield 164, which may be a physical barrier or enclosure designed to direct or block electromagnetic radiation in a specific direction. The directional shield 164 may be constructed from conductive materials such as metal to attenuate RF signals, thereby controlling the reception of electromagnetic waves. The directional shield 164 may be positioned around the receiver antenna 148 components and may act as a physical barrier that prevents RF signals from being received from undesired directions, thereby enhancing the precision and accuracy of signal reception. By reducing signal dispersion, the directional shield 164 enhances the system's overall sensitivity to detecting RF responses from underground objects or materials.

Further, embodiments may include a control panel 166, which may be a centralized interface including electronic controls and displays. The control panel 166 may serve as the user-accessible interface for configuring, monitoring, and managing the RF receiver device's 142 operational parameters and data output. In some embodiments, the control panel 166 may be designed to provide operators with intuitive access to control and monitor various aspects of the RF receiver device 142. The control panel 166 may allow for the configuration of settings such as signal frequency, transmission power, receiver sensitivity, and signal processing algorithms. In some embodiments, operators may use the control panel 166 to initiate and terminate detection operations, adjust calibration settings, and troubleshoot operational issues. In some embodiments, the control panel 166 may include a graphical display screen or LED indicators to present real-time status information and measurement results. In some embodiments, input controls such as buttons, knobs, or touch-sensitive panels may enable operators to interact with the device, input commands, and navigate through menu options. The control panel 166 may interface directly with the internal electronics of the RF receiver device 142, including the receiver unit 146, receiver antenna 148, and signal processing circuitry. Through electronic connections and communication protocols, the control panel 166 may send commands to adjust operational parameters and receive feedback and status updates from the RF receiver device 142. In some embodiments, the control panel 166 may be mounted on the support frame 144 and may provide an operator with control of the RF receiver device 142, including adjusting various settings and signaling the operator of a detected material. In some embodiments, a rechargeable battery 162 may power the RF receiver device 142, including the receiver unit 146 and control panel 166. In some embodiments, multiple batteries 162 may be used. In some embodiments, a tone generator 158, such as a speaker, may be mounted to the support frame 144 to provide audible signals to the operator for detecting target materials.

Further, embodiments may include a communication interface 168, which may be a hardware and software solution that enables data exchange between different systems or components within a network. The communication interface 168 may act as a bridge, facilitating the transfer of information by converting data into a format that can be transmitted and received by different devices. In some embodiments, the communication interface 168 may support various protocols and standards, such as Ethernet, Wi-Fi, Bluetooth, USB, and others, depending on the application. For example, an Ethernet interface may be used for wired network connections, providing reliable and high-speed data transfer. In some embodiments, a Wi-Fi interface may enable wireless connectivity, allowing the RF receiver device 142 to communicate with the central communications device 184, RF transmit device 102, remote servers, mobile devices, or cloud-based applications without physical cables. In some embodiments, Bluetooth and USB interfaces may also be included for short-range wireless communication and direct data transfer, respectively. The communication interface 168 may transmit the processed data from the DSP to external systems for further analysis, reporting, or storage. After the DSP processes the signals received from the ADC and extracts meaningful information about the target materials, the control panel 166 may package this data into suitable formats, such as JSON or XML. The communication interface 168 may then send this data over the network to a remote server or database, where it can be accessed by operators, analysts, or automated systems for further decision-making. In some embodiments, the communication interface 168 may provide remote monitoring and control of the RF receiver device 142. Operators may use a web-based interface or a mobile application to access real-time status updates, view detection logs, and adjust configuration settings. For example, if the RF receiver device 142 is to be calibrated for a new target material, the configuration updates can be sent remotely through the communication interface 168, minimizing or reducing on-site adjustments. In some embodiments, the communication interface 168 may support alerting and notification functionalities. When the control panel 166 detects the presence of hazardous materials, it can use the communication interface 168 to send immediate alerts to designated personnel via email, SMS, or push notifications.

Further, embodiments may include a processor 170, which may be responsible for executing instructions from programs and controlling the operation of other hardware components. The processor 170 may perform basic arithmetic, logic, control, and input/output (I/O) operations specified by the instructions in the programs. The processor 170 may operate by fetching instructions from memory 172, decoding them to determine the operation, executing the operations, and then storing the results. In some embodiments, the processor 170 may coordinate the overall system operations, manage communication between subsystems, and handle complex data analysis tasks that complement the real-time signal processing performed by the DSP. For example, when the RF receiver device 142 is powered on, the processor 170 may initiate a boot-up sequence that includes running diagnostics to check the status of all subsystems, such as the receiver unit 146 and control panel 166. During this initialization phase, the processor 170 may provide that each component receives the correct voltage and current levels for operation. The processor 170 may also load predefined detection configurations and communicate with the receiver unit 146 to configure their operating parameters based on the target material. In some embodiments, the processor 170 may handle user interface tasks, displaying system status indicators and receiving user inputs. The processor 170 may provide that the control panel 166 provides real-time feedback, such as green LED indicators for successful power-up and system readiness. In some embodiments, the processor 170 may manage data storage and logging, recording detection events and system performance metrics for future analysis.

Further, embodiments may include a memory 172, which may include suitable logic, circuitry, and/or interfaces that may be configured to store a machine code and/or a computer program with at least one code section executable by the processor 170. Examples of implementation of the memory 172 may include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. In some embodiments, the memory 172 may store configuration settings, signal patterns, and detection algorithms.

Further, embodiments may include a reception module 174, which may begin by connecting to the central communications device 184. The reception module 174 continuously polls and receives a request from the central communications device 184 to receive an RF signal. The reception module 174 commands the receiver unit 146 to receive the RF signal via receiver antenna 148 and stores the RF signal data in the receiver database 178.

Further, embodiments may include a transfer module 176, which continuously queries the transmission database 178 for a new data entry and extracts the new data entry stored in the transmission database 178. The transfer module 176 connects to the central communications device 184 and sends the extracted reception data from the reception database 178 to the central communications device 184 and the process returns to querying the reception database 178 for a new data entry.

Further, embodiments may include a reception database 178, which may contain data related to the reception of the RF signal. The reception database 178 may contain the target material, the timestamp of reception, the received RF signal, data from the processed RF signal, the geolocation of the RF receiver device 142 at the time of reception, etc. In some embodiments, the reception database 178 may include detailed information about the received frequency parameters, such as the frequency value, modulation type, and signal strength. In some embodiments, the reception database 178 may contain details about the detected target material, including the material's unique signature, the associated frequency range, and any other relevant detection parameters. In some embodiments, the reception database 178 may include geolocation data, capturing the precise longitude and latitude coordinates of the RF receiver device 142 at various points in time, including the time of signal reception.

Further, embodiments may include a specific material database 180, which may store and manage detailed information about various target materials. The specific material database 180 may be used to configure the detection parameters to identify specific materials based on their unique electromagnetic properties. Each entry in the database may be defined by the material's atomic structure, which includes the total number of protons and neutrons. The unique nuclear composition allows each substance to be distinctly identifiable and detectable through its resonant frequency. The specific material database 180 may contain a unique material ID, the common name of the material, the number of protons, the number of neutrons, and the atomic mass, which is the sum of protons and neutrons. The specific material database 180 may also contain calculated resonant frequencies based on the atomic characteristics. For example, the specific material database 180 may contain an entry for Arsenic (As) with 33 protons and 42 neutrons, resulting in an atomic mass of 75. The resonant frequencies for Arsenic could be 33 Hz, based on the number of protons, 42 Hz, based on the number of neutrons, and 75 Hz, based on the atomic mass. These frequencies may also be increased by orders of magnitude, such as 10× or 100×, to suit different detection environments. In some embodiments, for compounds, the specific material database 180 calculates a combined frequency based on the sum of the resonant frequencies of the constituent elements. For example, a formaldehyde molecule composed of 16 protons and 14 neutrons with a total atomic mass of 30 may have corresponding frequencies of 16 Hz, 14 Hz, and 30 Hz, respectively. Another example may be smokeless gunpowder, specifically nitroglycerin, with the chemical composition $CH_2NO_3CHNO_3CH_2NO_3$. The frequency for this compound may be calculated by summing the frequencies based on the atomic numbers of its constituent elements: 6 carbon+ 1×2 hydrogen+7 nitrogen+8×3 oxygen, repeated thrice, resulting in a total of 116 protons. This is then multiplied by 10 to yield a base frequency of 1160 Hz for detection purposes. In some embodiments, the specific material database 180 may account for overlapping frequencies among different elements and compounds. To enhance the accuracy of detection, the system may employ multiple methods to calculate and verify the target material's frequency, such as using combinations of proton counts, neutron counts, and atomic masses, which allows the system to distinguish between materials with similar frequencies by leveraging the unique resonant properties of each substance.

Further, embodiments may include a cloud 182, or communication network, which may be a wired and/or wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over the Internet, and relies on the sharing of resources to achieve coherence and economics of scale, like a public utility, while third-party clouds 182 enable organizations to focus on their core businesses instead of expending resources on computer infrastructure and maintenance.

Further, embodiments may include a central communications device 184, which may be a hub designed to coordinate and manage the operations of both the RF transmit device 102 and RF receiver device 142. The central communications device 184 may include a processor 188 equipped with advanced algorithms for signal processing and data analysis. In some embodiments, the processor 188 may handle the influx of data from both the RF transmit device 102 and RF receiver device 142, performing complex calculations to determine the presence and location of target materials. In some embodiments, the central communication device 184 may analyze signal patterns, filter out noise, and identify the unique signatures of specific materials. In some embodiments, the central communications device 184 may include multiple communication interfaces to connect with the RF transmit device 102 and RF receiver device 142. The communication interface may include wireless communication modules, such as Wi-Fi, Bluetooth, or specialized RF communication links, ensuring reliable and fast data transfer. The communication protocols may be designed to handle high volumes of data with minimal latency, allowing for real-time analysis and decision-making. In some embodiments, the central communication device 184 may include a detection database 196 that stores the geolocation, signal strength, and other pertinent information from the RF transmit device 102 and RF receiver device 142. In some embodiments, the stored data may include timestamps and geotags to provide a comprehensive record of the detection events. In some embodiments, the central communications device 184 may also include a user interface 190 that allows operators to monitor and control the system. The user interface 190 may provide real-time visualizations of the data, such as signal strength maps, geolocation coordinates, and detection alerts. In some embodiments, operators may configure system parameters, initiate scans, and review historical data through the user interface 190. In some embodiments, the central communications device 184 may provide that the RF transmit device 102 and RF receiver device 142 are coordinated in the timing of transmissions and receptions to optimize the detection process for accurate triangulation and precise localization of target materials.

Further, embodiments may include a memory 186, which may include suitable logic, circuitry, and/or interfaces that may be configured to store a machine code and/or a computer program with at least one code section executable by the processor 188. Examples of implementation of the memory 186 may include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. In some embodiments, the memory 186 may store configuration settings, signal patterns, and detection algorithms.

Further, embodiments may include a processor 188, which may be responsible for executing instructions from programs and controlling the operation of other hardware components. The processor 188 may perform basic arithmetic, logic, control, and input/output (I/O) operations specified by the instructions in the programs. The processor 188 may operate by fetching instructions from memory 186, decoding them to determine the operation, executing the operations, and then storing the results. In some embodiments, the processor 188 may coordinate the overall system operations, manage communication between subsystems, and handle complex data analysis tasks that complement the real-time signal processing performed by the DSP. The processor 188 may also load predefined detection configurations and communicate with the RF transmit device 102 and RF receiver device 142 to configure their operating parameters based on the target material. In some embodiments, the processor 188 may handle user interface tasks, displaying system status indicators and receiving user inputs. The processor 188 may provide that the central communication device 184 provides real-time feedback, such as green LED indicators for successful power-up and system readiness. In some embodiments, the processor 188 may manage data storage and logging, recording detection events and system performance metrics for future analysis.

Further, embodiments may include a user interface 190, which may be designed to provide operators with a means of interacting with the system and offer real-time visualizations, control options, and feedback. In some embodiments, the user interface 190 may be a high-resolution touchscreen display that allows for visual feedback and touch-based interactions. In some embodiments, the real-time signal visualization may display live data from the RF transmit device 102 and RF receiver device 142, including graphical representations such as signal strength bars, frequency spectrums, and real-time plots of received signal patterns. In some embodiments, color-coded indicators may highlight areas of interest or potential detections. In some embodiments, the user interface 190 may include a dynamic geolocation map that shows the positions of the RF transmit device 102 and RF receiver device 142, as well as detected target materials. In some embodiments, the map may be interactive, allowing users to zoom in and out, pan across different areas, and click on specific points for more detailed information. In some embodiments, detected materials may be marked with icons that can be clicked to view additional data, such as signal strength and frequency. In some embodiments, the control panel of the central communication device 184 may provide various controls to configure and manage the system, including adjusting transmission frequencies, power levels, and gain settings. In some embodiments, the operators may also initiate or stop scans, reset devices, and configure synchronization settings. In some embodiments, the user interface 190 may provide alerts and notifications to the operators, such as when a potential target material is detected. In some embodiments, the user interface 190 may generate a visual pop-up on the screen, and an audio alarm sounds to attract the operator's attention. In some embodiments, the alert may provide details about the detected material stored in the detection database 196, including signal strength, frequency, geolocation coordinates, and the time of detection, along with actionable options for the operator to acknowledge the alert, view more detailed analysis, or mark it for further investigation.

Further, embodiments may include control module 192, which begins with the system being activated. The user inputs the target material, and the control module 192 compares the inputted target material to the specific material database 198. The control module 192 extracts the corresponding frequency data for the inputted target material from the specific material database 198. The control module 192 connects to the RF transmit device 102 and sends the extracted frequency data to the RF transmit device 102. The control module 192 connects to the RF receiver device 142 and sends a request to the RF receiver device 142 to receive the RF signal. The control module 192 initiates the processing module 194.

Further, embodiments may include a processing module 194, which may begin by being initiated by the control module 192. The processing module 194 continuously polls and receives the data from the RF transmit device 102 and the RF receiver device 142. The processing module 194 stores the received data in the detection database 196. The processing module 194 processes the RF signal data and sends the output to the user interface 190. The processing module 194 returns to the control module 192.

Further, embodiments may include a detection database 196, which may be created in the process described in the control module 192, which stores the received data from the RF transmit device 102 and the RF receiver device 142 in the detection database 196. The detection database 196 may contain the target material, the transmitted frequency by the transmitter antenna 120, timestamps of the transmission, geolocation of the RF transmit device 102, the timestamp of reception, the received RF signal, data from the processed RF signal, the geolocation of the RF receiver device 142 at the time of reception, etc. In some embodiments, the detection database 196 may include detailed information about the frequency parameters, such as the frequency value, modulation type, power level, and signal strength. In some embodiments, the detection database 196 may include details such as the material's unique signature, the associated frequency range, and any other relevant detection parameters. In some embodiments, the detection database 196 may include advanced data processing capabilities and may analyze signal patterns, filter out noise, and identify unique signatures of target materials.

Further, embodiments may include a specific material database 198, which may store and manage detailed information about various target materials. The specific material database 198 may be used to configure the detection parameters to identify specific materials based on their unique electromagnetic properties. Each entry in the database may be defined by the material's atomic structure, which includes the total number of protons and neutrons. The unique nuclear composition allows each substance to be distinctly identifiable and detectable through its resonant frequency. The specific material database 198 may contain a unique material ID, the common name of the material, the number of protons, the number of neutrons, and the atomic mass, which is the sum of protons and neutrons. The specific material database 198 may also contain calculated resonant frequencies based on the atomic characteristics. The resonant frequencies are useful for configuring the transmitter unit 106 of the RF transmit device 102, which sends out signals at these specific frequencies to induce a resonant response in the target material. For example, the specific material database 198 may contain an entry for Arsenic (As) with 33 protons and 42 neutrons, resulting in an atomic mass of 75. The resonant frequencies for Arsenic could be 33 Hz, based on the number of protons, 42 Hz, based on the number of neutrons, and 75 Hz, based on the atomic mass. These frequencies may also be increased by orders of magnitude, such as 10× or 100×, to suit different detection environments. In some embodiments, for compounds, the specific material database 198 calculates a combined frequency based on the sum of the resonant frequencies of the constituent elements. For example, a formaldehyde molecule composed of 16 protons and 14 neutrons with a total atomic mass of 30 may have corresponding frequencies of 16 Hz, 14 Hz, and 30 Hz, respectively. Another example may be smokeless gunpowder, specifically nitroglycerin, with the chemical composition $CH_2NO_3CHNO_3CH_2NO_3$. The frequency for this compound may be calculated by summing the frequencies based on the atomic numbers of its constituent elements: 6 carbon+1×2 hydrogen+7 nitrogen+8×3 oxygen, repeated thrice, resulting in a total of 116 protons. This is then multiplied by 10 to yield a base frequency of 1160 Hz for detection purposes. In some embodiments, the specific material database 198 may account for overlapping frequencies among different elements and compounds. To enhance the accuracy of detection, the system may employ multiple methods to calculate and verify the target material's frequency, such as using combinations of proton counts, neutron counts, and atomic masses, which allows the system to distinguish between materials with similar frequencies by leveraging the unique resonant properties of each substance.

In another embodiment, the material detection system uses a hybrid antenna that can operate both in RF-based and magnetic-based detection modes. This system can switch between detecting materials based on their interaction with the RF field or the magnetic field, depending on the material being analyzed. In RF mode, the antenna transmits RF waves, and the system analyzes how the material reflects or absorbs these waves, providing information based on the dielectric constant or conductive properties of the material. In magnetic mode, the antenna focuses on the interaction between the material and the magnetic field component of the electromagnetic wave, allowing detection of materials with high magnetic permeability or strong magnetic responses. For example, the system could be used to detect metallic substances or magnetic compounds, such as those found in explosive materials, by optimizing the detection process based on which field interaction yields the clearest signature.

In another embodiment, a near-field material detection system uses a magnetic-based loop antenna that focuses on magnetic field interaction within close proximity to the target material. This system uses magnetic resonance principles, detecting changes in the magnetic field due to interactions with materials possessing magnetic susceptibility, such as ferromagnetic metals. The loop antenna generates a localized oscillating magnetic field, and when materials are introduced into the detection zone, they alter the field by inducing eddy currents or magnetic resonance effects. These changes are then measured to determine the material's properties. This method is particularly useful in applications such as industrial quality control or close-range security screening, where detecting the magnetic characteristics of a material offers clear advantages.

In another embodiment, far-field magnetic resonance techniques are employed for material detection at greater distances. This system operates by transmitting an electromagnetic wave where the magnetic field component is emphasized, focusing on its interaction with materials that have resonant magnetic properties. By tuning the system to specific resonant frequencies, materials that exhibit strong magnetic responses, such as certain alloys or ferromagnetic materials, can be detected over a larger range. The detection system then analyzes the phase or amplitude of the reflected wave to infer material characteristics. This embodiment is particularly suitable for remote sensing applications, such as geological surveys, where materials can be identified based on their magnetic resonance even when located at a distance from the detection apparatus.

In another embodiment, an array of antennas is used to simultaneously detect materials based on both RF and magnetic field interactions. The antenna array consists of dipole antennas optimized for detecting the electric component of the RF wave and loop antennas that focus on the magnetic field interaction. These two types of signals are combined to create a composite material signature, allowing for detailed analysis of both the dielectric and magnetic properties of the material. By processing both electric and magnetic field data, the system can more accurately identify materials that exhibit a combination of electrical conductivity and magnetic permeability, such as advanced composites or stealth materials. This dual-mode system can be particularly useful in defense or aerospace applications.

In another embodiment, a magnetic-based antenna system is designed for material detection in environments where RF signals would typically be degraded, such as underground or underwater. This system uses a loop antenna to generate a magnetic field that interacts with materials possessing strong magnetic properties, even in situations where RF signals are heavily attenuated. The antenna detects variations in the magnetic field caused by materials with high permeability, such as iron or nickel-based substances. This method allows for the detection of magnetic materials in conditions where RF detection would be unreliable, such as in deep-sea exploration or subterranean mining operations, where conventional RF signals would fail to penetrate effectively.

In another embodiment, a phased array system is designed specifically to manipulate the magnetic component of the electromagnetic wave for high-resolution material detection. A phased array of loop antennas is used to steer and focus the magnetic field, creating a directed magnetic beam that can scan across a target area. The system detects materials based on how they alter the magnetic field, allowing for precise location and identification of magnetic objects. By adjusting the phase and amplitude of each antenna element, the system provides a fine degree of control, enabling highly localized material detection. This approach is useful in situations requiring detailed spatial resolution, such as identifying hidden metallic objects in security screening or detailed inspections in industrial settings.

In another embodiment, a portable or wearable material detection system is implemented using a small, magnetic-based loop antenna for detecting magnetic materials in close proximity. This compact system allows security personnel or industrial workers to move through different environments while continuously monitoring for materials that exhibit magnetic properties. The loop antenna generates a localized magnetic field and detects perturbations caused by nearby magnetic materials, such as concealed weapons or magnetic tags. The system then alerts the user when such materials are detected, making it ideal for field operations where mobility and case of use are critical.

In another embodiment, the material detection system is entirely RF-based, using a highly optimized RF antenna to detect materials based solely on their interaction with the RF field. The RF antenna transmits electromagnetic waves at specific frequencies, and the system analyzes how these waves are reflected, absorbed, or scattered by the material. By focusing on the dielectric constant or conductive properties of the target material, the system can accurately identify substances such as explosives, chemicals, or other dielectric materials. This approach is particularly effective in environments where magnetic field-based detection is unnecessary or less effective. The RF-based system can be adapted for wide-ranging applications, from industrial material testing to security scanning, where detecting the electrical characteristics of the material is sufficient for identification.

Figure 2:
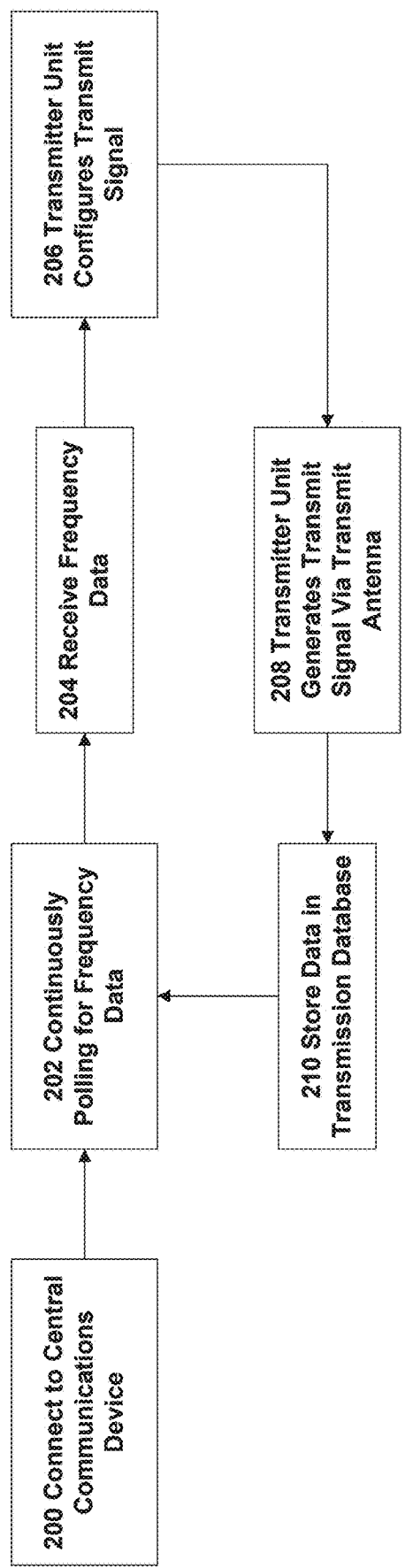
FIG. 2 illustrates a transmission module according to an embodiment.

FIG. 2 illustrates the transmission module 134. The process begins with the transmission module 134 connecting, at step 200, to the central communications device 184. The transmission module 134 may connect to the central communications device 184 through the cloud 182 via communication interface 128 once the RF transmit device 102 is activated. The transmission module 134 continuously polls, at step 202, for the frequency data from the central communications device 184. The transmission module 134 may continuously poll to receive the transmission data from the central communication device 184, such as the frequency data, target material data, etc. In some embodiments, the transmission module 134 may receive the target material, compare the target material to the specific material database 140, and extract the transmission data.

The transmission module 134 receives, at step 204, the frequency data from the central communications device 184. The transmission module 134 may receive the transmission data from the central communication device 184, such as the frequency data, target material data, etc. In some embodiments, the transmission module 134 may receive the target material, compare the target material to the specific material database 140, and extract the transmission data. In some embodiments, the transmission module 134 may receive precise timestamps in the data packets from the control module 192. The timestamps will indicate the exact times for the start of transmission and reception operations. In some embodiments, synchronized clocks may be used by the central communication device 184, the RF transmit device 102, and the RF receiver device 142 to provide that the devices operate in a coordinated manner. For example, the transmission module 134 may receive a data packet that includes the start time for transmission, duration of transmission, start time for reception, and unique session ID, which may be a unique identifier for the transmission-reception session.

The transmission module 134 commands, at step 206, the transmitter unit 106 to configure the transmit signal. The transmitter unit 106 prepares the signal that will be transmitted for the purpose of detecting a target material. In some embodiments, the parameters and components may be set up with the desired characteristics to generate the RF signal. The control panel 126 determines the specific parameters of the RF signal to be generated. The parameters may include the frequency, amplitude, and modulation type to effectively detect the target materials. Once the parameters are set, the control panel 126 sends a command to activate the oscillator circuit 108 within the transmitter unit 106. The oscillator circuit 108 may be responsible for generating a stable RF signal at the desired frequency and may include components like capacitors, inductors, and amplifiers that work together to create the oscillating signal. The power delivery to the oscillator circuit may be managed by the SCR 114. When the control panel 126 sends a gate signal to the SCR 114, it switches from a non-conductive to a conductive state, allowing current from the power source, such as batteries, to flow to the oscillator circuit. After the oscillator circuit generates the RF signal, the transformer 116 adjusts the voltage level of the signal to match the specifications of the transmit antenna 120. It may also provide impedance matching to provide efficient signal transmission. The transformer 116 provides that the RF signal is at the appropriate voltage and current levels for optimal transmission. For example, the control panel 126 may determine that an RF signal with a frequency of 50 Hz is suitable to detect a specific material. It sends a command to the transmitter unit 106 to configure this signal. The oscillator circuit 108 is activated, generating an RF signal at 50 Hz. The SCR 114 is triggered, allowing power from the batteries to flow to the oscillator circuit 108. The generated signal is then conditioned by the transformer 116, ensuring it is at the correct voltage level for transmission.

The transmission module 134 commands, at step 208, the transmitter unit 106 to generate the transmit signal via the transmit antenna 120. The transmitter unit 106 generates the RF signal and transmits it through the transmit antenna 120 by converting electrical energy into radio waves that can be used for detecting specific materials. The transmit antenna 120 radiates the RF signal into the environment. The radio waves propagate through the medium, such as air or ground, and interact with the target materials. The interaction between the RF signal and the target materials will produce detectable changes in the signal, which can be received and analyzed by the RF receiver device 142. For example, the transmitter unit 106 generates a wave pulse at a specified frequency that is transmitted directionally into the ground. The generated frequency is closely approximate or exact to that of the target material, and that relationship creates a responsive RF wave and/or a magnetic line between the transmitter antenna 120 and the target. When the RF transmit device 102 is aligned with a target material, for example, when the opening of the directional shield 124 is pointing toward the target material, the voltage produced by the receiver antenna 148 of the RF receiver device 142 changes and thereby produces a detection output signal, such as an audio signal having a tone different than that of the baseline. A reflective wave is produced by the target material that amplifies, resonates, offsets, or otherwise modifies the magnetic field passing through the receiver antenna 148 of the RF receiver device 142 to alter the voltage produced, thereby generating the output signal. The transmission module 134 stores, at step 210, the transmission data in the transmission database 138, and the process returns to continuously polling for the frequency data from the central communications device 184. The transmission database 138 may contain the received frequency from the central communication device 184, the target material from the central communication device 184, the transmitted frequency by the transmitter antenna 120, timestamps of the transmission, etc. In some embodiments, the transmission database 138 may include detailed information about the frequency parameters, such as the frequency value, modulation type, and power level. In some embodiments, the transmission database 138 may include details such as the material's unique signature, the associated frequency range, and any other relevant detection parameters. In some embodiments, the transmission database 138 may include geolocation data, capturing the precise longitude and latitude coordinates of the RF transmit device 102 at various points in time.

Figure 3:
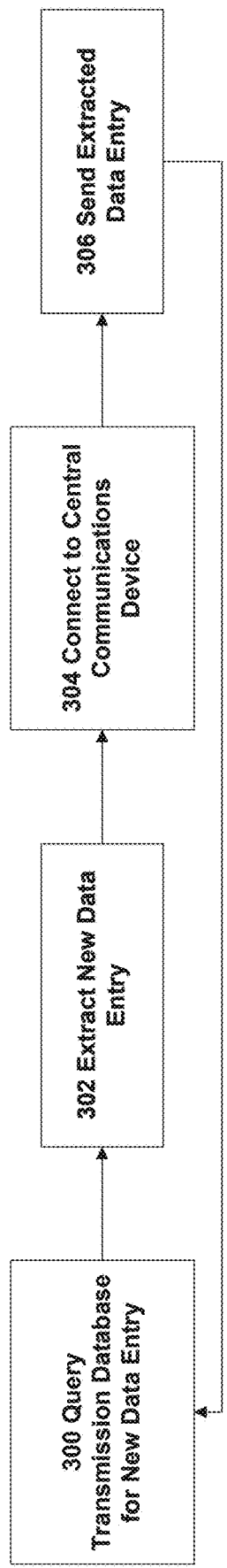
FIG. 3 illustrates a communication module according to an embodiment.

FIG. 3 illustrates the communication module 136. The process begins with the communication module 136 continuously querying, at step 300, the transmission database 138 for a new data entry. In some embodiments, the communication module 136 continuously sends a query to the transmission database 138 for a new data entry, and once the data is stored, the communication module 136 extracts the new data entry. The communication module 136 extracts, at step 302, the new data entry stored in the transmission database 138. The communication module 136 extracts the data entry, which contains the received frequency from the central communication device 184, the target material from the central communication device 184, the transmitted frequency by the transmitter antenna 120, timestamps of the transmission, etc.

The communication module 136 connects, at step 304, to the central communications device 184. The communication module 136 may connect to the central communication device 184 through the communication interface 128. The communication module 136 sends, at step 306, the extracted transmission data from the transmission database 138 to the central communications database 184, and the process returns to querying the transmission database 138 for a new data entry. The data may include the received frequency from the central communication device 184, the target material from the central communication device 184, the transmitted frequency by the transmitter antenna 120, timestamps of the transmission, etc. In some embodiments, the data may include detailed information about the frequency parameters, such as the frequency value, modulation type, and power level. In some embodiments, the data may include details such as the material's unique signature, the associated frequency range, and any other relevant detection parameters. In some embodiments, the data may include geolocation data, capturing the precise longitude and latitude coordinates of the RF transmit device 102 at various points in time.

Figure 4:
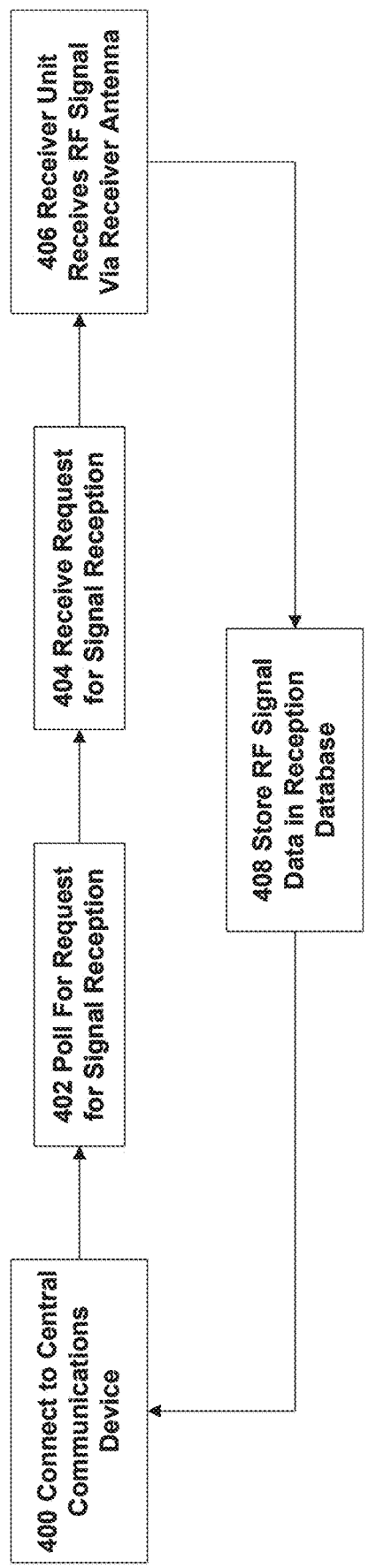
FIG. 4 illustrates a reception module according to an embodiment.

FIG. 4 illustrates the reception module 174. The process begins with the reception module 174 connecting, at step 400, to the central communications device 184. The reception module 174 may connect to the central communications device 184 through the cloud 182 via communication interface 168 once the RF receiver device 142 is activated. The reception module 174 continuously polls, at step 402, for a request from the central communications device 184 to receive an RF signal. The reception module 174 is continuously polling to receive a request to receive the RF signal. In some embodiments, the request may include a timestamp of the time the RF receiver device 142 should activate or listen for the RF response signal via the receiver antenna 148. The reception module 174 receives, at step 404, the request to receive an RF signal from the central communications device 184. The reception module 174 receives a request to receive the RF signal. In some embodiments, the reception module 174 may receive a timestamp of the time the RF receiver device 142 should activate or listen for the RF response signal via the receiver antenna 148. In some embodiments, the request may include a calculated delay period between the transmission and reception operations. The delay period accounts for the time it takes for the signal to travel from the RF transmit device 102 to the potential target material and then back to the RF receiver device 142. The delay may be adjusted based on the expected distance between the devices and the target material, ensuring that the RF receiver device 142 only starts listening after the transmission is complete and any direct transmission signal has dissipated. For example, the reception module 174 may receive a data packet that includes the start time for transmission, duration of transmission, start time for reception, and unique session ID, which may be a unique identifier for the transmission-reception session.

The reception module 174 commands, at step 406, the receiver unit 146 to receive the RF signal via receiver antenna 148. The receiver unit 146 captures the RF signal that has interacted with the environment and potential target materials using the receiver antenna 148. The receiver antenna 148 captures the incoming RF signal, which has been transmitted by the RF transmit device 102 and has interacted with the environment and any target materials present. The receiver antenna 148 may be designed to effectively capture these radio waves and convert them back into electrical signals. Once the RF signal is received by the receiver antenna 148, it may be fed into an RF amplifier, which boosts the signal strength without significantly altering its characteristics. In some embodiments, the use of the standard atomic structure of a material may be used to calculate the resonant frequency to which a particular substance may generate or respond. Each element and compound includes a definable atomic structure composed of the total number of protons and neutrons of that target material. This unique nuclear composition of every substance makes it uniquely identifiable and detectable. The manner in which this information is applied thus enables the detection of any target substance. A target material can be detected and located based on a resonant, responsive RF wave and/or magnetic relationship between the target and a transmitter antenna 120 transmitting at the frequency specific and unique to the target material. The RF transmit device 102, through the transmitter antenna 120, induces a resonance due to responsive RF waves and/or magnetic and/or otherwise in a targeted material to resonate at a specific computed frequency.

The receiver antenna 148 and receiver circuit 150 detect the resonance induced in the material and, in so doing, indicate the approximate line of bearing to the material. The primary method used by this detection system to detect specific materials is based on tuning the circuit 108 of the RF transmit device 102 to a specific value that is computed for the material of interest. The frequency can be based on any of the three defining characteristics of the substance, the number of protons, the number of neutrons, or the atomic mass, such as the sum of protons and neutrons and combinations thereof. The frequency can be transmitted at varying voltages to compensate for other external effects or interference. In some embodiments, the specific material database 180 containing characteristics of common materials may be used to calculate the resonant frequencies. In some embodiments, the receiver unit 146 processes the received RF signal to extract meaningful data that can be analyzed for the presence of specific materials, which may involve further amplification, filtering, digitization, and initial data processing before the signal is sent to the central communication device 184 for detailed analysis. In some embodiments, after the RF signal is received and initially amplified, it may require further amplification to provide the signal is at an optimal level for processing. In some embodiments, an additional RF amplifier within the receiver unit 146 may boost the signal strength while maintaining its integrity. The amplified signal may be subjected to more advanced filtering by the filter circuit, which removes any residual noise and unwanted frequencies that might have passed through the initial filtering stage. In some embodiments, the filtering may involve bandpass filters that allow only the desired frequency range to pass through. The filtered analog signal may be converted into a digital format using an Analog-to-Digital Converter, ADC. The ADC samples the analog signal at a high rate and converts it into a series of digital values. The digitized signal may be processed using digital techniques. The digital signal may be fed into a Digital Signal Processor, DSP, within the receiver unit 146. In some embodiments, the DSP may perform initial data processing tasks such as demodulation, noise reduction, and feature extraction. Demodulation involves extracting the original information-bearing signal from the carrier wave. Noise reduction techniques may further clean the signal, making it easier to analyze. Feature extraction may involve identifying characteristics of the signal that are indicative of the presence of target materials.

The reception module 174 stores, at step 408, the RF signal data in the reception database 178. The reception database 178 may contain the target material, the timestamp of reception, the received RF signal, data from the processed RF signal, the geolocation of the RF receiver device 142 at the time of reception, etc. In some embodiments, the reception database 178 may include detailed information about the received frequency parameters, such as the frequency value, modulation type, and signal strength. In some embodiments, the reception database 178 may contain details about the detected target material, including the material's unique signature, the associated frequency range, and any other relevant detection parameters. In some embodiments, the reception database 178 may include geolocation data, capturing the precise longitude and latitude coordinates of the RF receiver device 142 at various points in time, including the time of signal reception.

Figure 5:
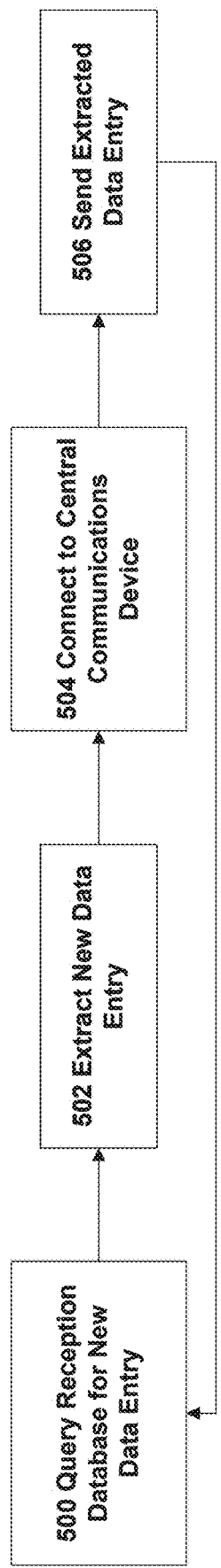
FIG. 5 illustrates a transfer module according to an embodiment.

FIG. 5 illustrates the transfer module 176. The process begins with the transfer module 176 continuously querying, at step 500, the transmission database 178 for a new data entry. In some embodiments, the transfer module 176 continuously sends a query to the reception database 178 for a new data entry, and once the data is stored, the transfer module 176 extracts the new data entry. The transfer module 176 extracts, at step 502, the new data entry stored in the transmission database 178. The transfer module 176 extracts the data entry, which contains the target material, the timestamp of reception, the received RF signal, data from the processed RF signal, the geolocation of the RF receiver device 142 at the time of reception, etc. The transfer module 176 connects, at step 504, to the central communications device 184. The transfer module 176 may connect to the central communication device 184 through the communication interface 168. The transfer module 176 sends, at step 506, the extracted reception data from the reception database 178 to the central communications database 184, and the process returns to querying the reception database 178 for a new data entry. The data may include the target material, the timestamp of reception, the received RF signal, data from the processed RF signal, the geolocation of the RF receiver device 142 at the time of reception, etc. In some embodiments, the data may include detailed information about the received frequency parameters, such as the frequency value, modulation type, and signal strength. In some embodiments, the data may contain details about the detected target material, including the material's unique signature, the associated frequency range, and any other relevant detection parameters. In some embodiments, the data may include geolocation data, capturing the precise longitude and latitude coordinates of the RF receiver device 142 at various points in time, including the time of signal reception.

Figure 6:
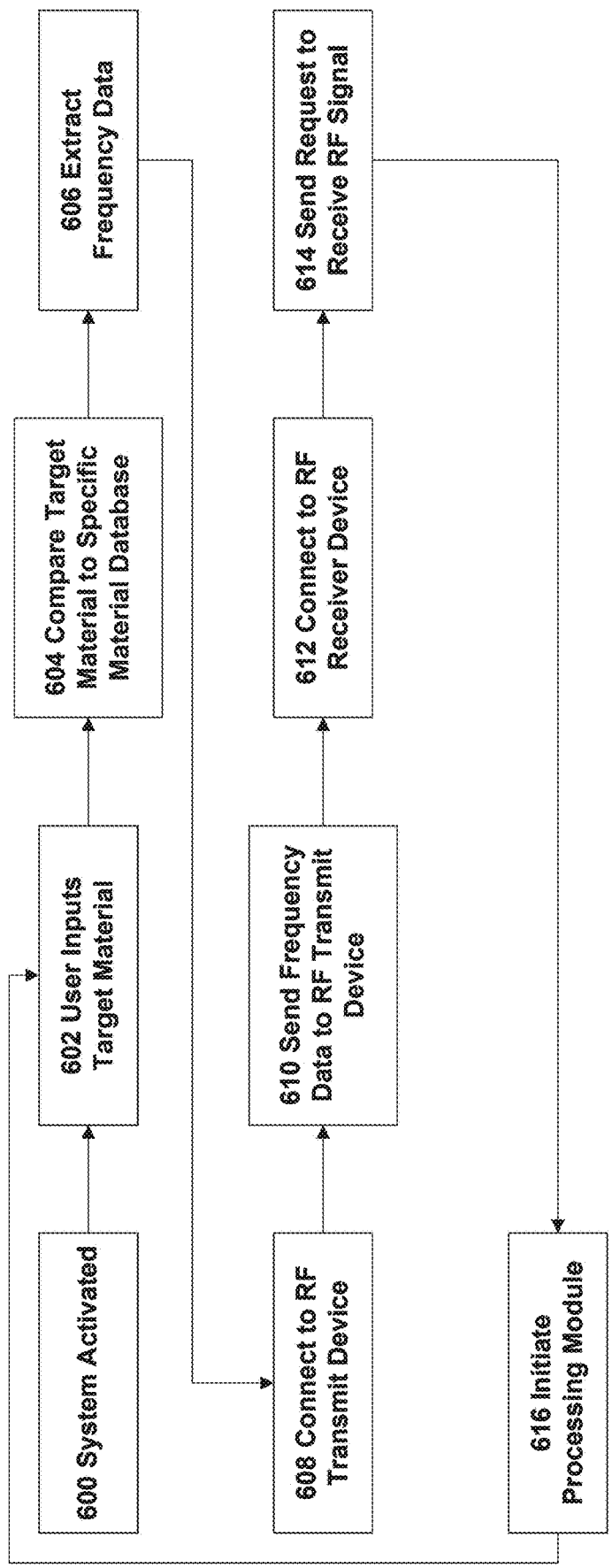
FIG. 6 illustrates a control module according to an embodiment.

FIG. 6 illustrates the control module 192. The process begins with the system being activated at step 600. The user or operator may activate the central communications device 184. The user inputs, at step 602, the target material. The user may input the desired target material in the user interface 190 of the central communications device 184. In some embodiments, the target material may be a specific element or compound, such as uranium or gunpowder. In some embodiments, the user may view the specific material database 198 to select the target material. In some embodiment, the user may select a plurality of target materials to detect, which may require additional or sequenced transmissions and receptions from the RF transmit device 102 and RF receiver device 142.

The control module 192 compares, at step 604, the inputted target material to the specific material database 198. The specific material database 198 may be used to configure the detection parameters to identify specific materials based on their unique electromagnetic properties. Each entry in the database may be defined by the material's atomic structure, which includes the total number of protons and neutrons. The unique nuclear composition allows each substance to be distinctly identifiable and detectable through its resonant frequency. The specific material database 198 may contain a unique material ID, the common name of the material, the number of protons, the number of neutrons, and the atomic mass, which is the sum of protons and neutrons. The specific material database 198 may also contain calculated resonant frequencies based on the atomic characteristics. The resonant frequencies are useful for configuring the transmitter unit 106 of the RF transmit device 102, which sends out signals at these specific frequencies to induce a resonant response in the target material. For example, the specific material database 198 may contain an entry for Arsenic (As) with 33 protons and 42 neutrons, resulting in an atomic mass of 75. The resonant frequencies for Arsenic could be 33 Hz, based on the number of protons, 42 Hz, based on the number of neutrons, and 75 Hz, based on the atomic mass. These frequencies may also be increased by orders of magnitude, such as 10× or 100×, to suit different detection environments. In some embodiments, for compounds, the specific material database 198 calculates a combined frequency based on the sum of the resonant frequencies of the constituent elements. For example, a formaldehyde molecule composed of 16 protons and 14 neutrons with a total atomic mass of 30 may have corresponding frequencies of 16 Hz, 14 Hz, and 30 Hz, respectively. Another example may be smokeless gunpowder, specifically nitroglycerin, with the chemical composition $CH_2NO_3CHNO_3CH_2NO_3$. The frequency for this compound may be calculated by summing the frequencies based on the atomic numbers of its constituent elements: 6 carbon+1×2 hydrogen+7 nitrogen+8×3 oxygen, repeated thrice, resulting in a total of 116 protons. This is then multiplied by 10 to yield a base frequency of 1160 Hz for detection purposes. In some embodiments, the specific material database 198 may account for overlapping frequencies among different elements and compounds. To enhance the accuracy of detection, the system may employ multiple methods to calculate and verify the target material's frequency, such as using combinations of proton counts, neutron counts, and atomic masses, which allows the system to distinguish between materials with similar frequencies by leveraging the unique resonant properties of each substance.

The control module 192 extracts, at step 606, the corresponding frequency data for the inputted target material from the specific material database 198. The control module 192 extracts the frequency data that is related to the target material, such as the calculated resonant frequencies based on the atomic characteristics. The control module 192 connects, at step 608, to the RF transmit device 102. The control module 192 may connect to the RF transmit device 102 via the cloud 182.

The control module 192 sends, at step 610, the extracted frequency data to the RF transmit device 102. The control module 192 may send the extracted frequency data, such as the calculated resonant frequencies based on the atomic characteristics. In some embodiments, the control module 192 may include precise timestamps in the data packets sent to both the RF transmit device 102 and RF receiver device 142. The timestamps will indicate the exact times for the start of transmission and reception operations. In some embodiments, synchronized clocks may be used by the central communication device 184, the RF transmit device 102, and the RF receiver device 142 to provide that the devices operate in a coordinated manner. For example, the control module 192 may send a data packet that includes the start time for transmission, duration of transmission, start time for reception, and unique session ID, which may be a unique identifier for the transmission-reception session. In some embodiments, the control module 192 may implement guard intervals, which are short periods inserted between the transmission and reception windows to account for any potential overlap or unforeseen delays. These intervals help provide that the RF receiver device 142 does not pick up any residual signal from the RF transmit device 102.

The control module 192 connects, at step 612, to the RF receiver device 142. The control module 192 may connect to the RF receiver device 142 via the cloud 182. The control module 192 sends, at step 614, a request to the RF receiver device 142 to receive the RF signal. In some embodiments, the control module 192 may calculate and include a specific delay period between the transmission and reception operations. The delay period accounts for the time it takes for the signal to travel from the RF transmit device 102 to the potential target material and then back to the RF receiver device 142. The delay may be adjusted based on the expected distance between the devices and the target material, ensuring that the RF receiver device 142 only starts listening after the transmission is complete and any direct transmission signal has dissipated. For example, the control module 192 may send a data packet that includes the start time for transmission, duration of transmission, start time for reception, and unique session ID, which may be a unique identifier for the transmission-reception session. In some embodiments, the control module 192 may implement guard intervals, which are short periods inserted between the transmission and reception windows to account for any potential overlap or unforeseen delays. These intervals help provide that the RF receiver device 142 does not pick up any residual signal from the RF transmit device 102. The control module 192 initiates, at step 616, the processing module 194. The processing module 194 continuously polls and receives the data from the RF transmit device 102 and the RF receiver device 142. The processing module 194 stores the received data in the detection database 196. The processing module 194 processes the RF signal data and sends the output to the user interface 190. The processing module 194 returns to the control module 192.

Figure 7:
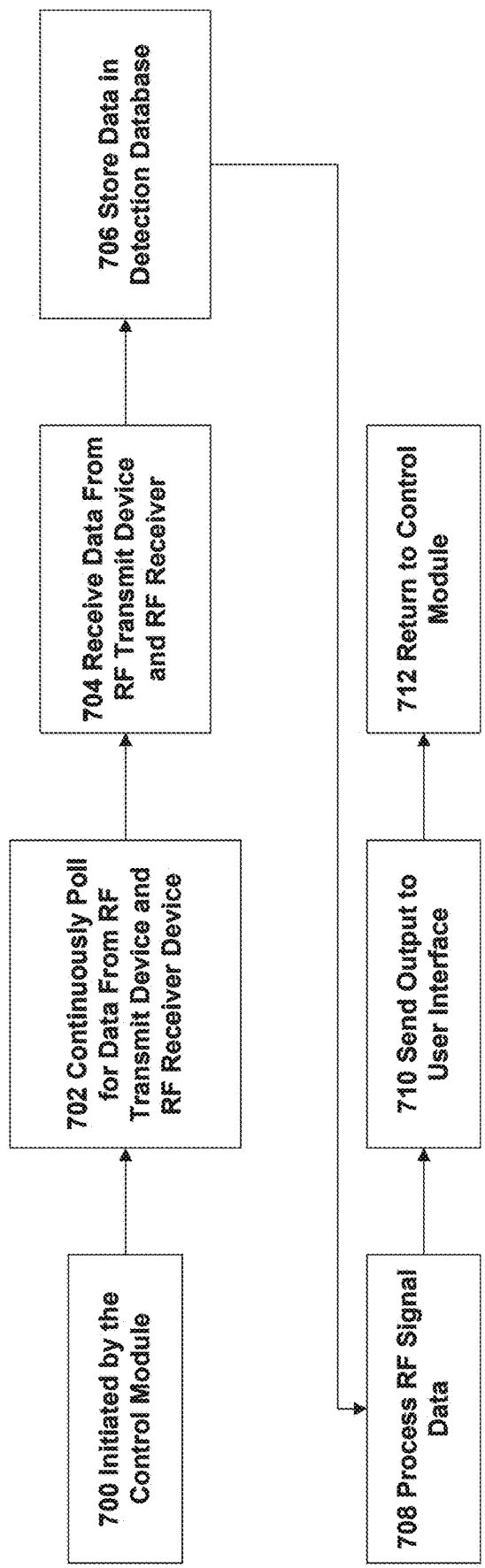
FIG. 7 illustrates a processing module according to an embodiment.

FIG. 7 illustrates the processing module 194. The process begins with the processing module 194 being initiated, at step 700, by the control module 192. The processing module 194 continuously polls, at step 702, for the data from the RF transmit device 102 and the RF receiver device 142. The processing module 194 polls for the data from the RF transmit device 102, such as the transmitted frequency by the transmitter antenna 120, timestamps of the transmission, geolocation data of the RF transmit device 102 at the time of transmission, etc., and the data from the RF receiver device 142, such as the target material, the timestamp of reception, the received RF signal, data from the processed RF signal, the geolocation of the RF receiver device 142 at the time of reception, etc.

The processing module 194 receives, at step 704, the data from the RF transmit device 102 and the RF receiver device 142. The processing module 194 receives the data from the RF transmit device 102, such as the transmitted frequency by the transmitter antenna 120, timestamps of the transmission, geolocation data of the RF transmit device 102 at the time of transmission, etc., and the data from the RF receiver device 142, such as the target material, the timestamp of reception, the received RF signal, data from the processed RF signal, the geolocation of the RF receiver device 142 at the time of reception, etc. The processing module 194 stores, at step 706, the received data in the detection database 196. The detection database 196 may contain the target material, the transmitted frequency by the transmitter antenna 120, timestamps of the transmission, geolocation of the RF transmit device 102, the timestamp of reception, the received RF signal, data from the processed RF signal, the geolocation of the RF receiver device 142 at the time of reception, etc. In some embodiments, the detection database 196 may include detailed information about the frequency parameters, such as the frequency value, modulation type, power level, and signal strength. In some embodiments, the detection database 196 may include details such as the material's unique signature, the associated frequency range, and any other relevant detection parameters. In some embodiments, the detection database 196 may include advanced data processing capabilities and may analyze signal patterns, filter out noise, and identify unique signatures of target materials.

The processing module 194 processes, at step 708, the RF signal data. For example, the processing module 194 may integrate the data from the RF transmit device 102 and the RF receiver device 142 to accurately determine if a target material has been detected. The data extracted from the detection database 196 may include the transmission data, such as transmitted frequency, target material details, timestamps of transmission, geolocation data, etc., and the reception data, such as the received signal, processed signal data, timestamps of reception, signal strength, geolocation data, etc. The processing module 194 may use the timestamps to synchronize the data from both the RF transmit device 102 and the RF receiver device 142 to provide that the transmitted and received signals correspond accurately to the same time frame. The processing module 194 may extract the transmitted frequencies and the received signal frequencies, including detailed parameters such as frequency value, modulation type, and signal strength. The processing module 194 may use the specific material database 198 to retrieve the resonant frequencies associated with the target material, including checking the material's unique ID, atomic structure, and calculated resonant frequencies based on protons, neutrons, and atomic mass. The processing module 194 may compare the received signal frequencies with the resonant frequencies of the target material stored in the specific material database 198. The processing module 194 looks for matches or significant correlations that indicate the presence of the target material. For example, if the target material is Arsenic, the processing module 194 will check for frequencies such as 33 Hz, 42 Hz, and 75 Hz, along with their higher-order multiples like 330 Hz and 4200 Hz, depending on the detection environment. In some embodiments, the processing module 194 may employ multiple methods to verify the detected frequencies, including checking combinations of proton counts, neutron counts, and atomic masses. The processing module 194 may also consider potential overlapping frequencies among different elements and compounds to distinguish between materials with similar resonant properties. In some embodiments, the processing module 194 may analyze the signal strength and consistency over the reception period. For example, consistent signal patterns that match the resonant frequencies of the target material strengthen the likelihood of accurate detection. In some embodiments, the processing module 194 may correlate the geolocation data from the RF transmit device 102 and RF receiver device 142 to pinpoint the exact location of the detected material. In some embodiments, the processing module 194 may perform contextual analysis, considering the environmental conditions, movement patterns, and the relative positions of the RF transmit device 102 and RF receiver device 142 to validate the detection and rule out false positives.

The processing module 194 sends, at step 710, the output to the user interface 190. The processing module 194 may generate a detection alert that is displayed on the user interface 190. In some embodiments, the alert may include detailed information such as the material identified, its location, the detected frequencies, and the time of detection. In some embodiments, the processing module 194 may store the processed data in the detection database 196 for future reference and analysis. In some embodiments, the processing module 194 may generate a report that may be accessed by operators through the user interface 190, providing insights into the detection event and allowing for further action if desired. The processing module 194 returns, at step 712, to the control module 192.

In one embodiment, the system utilizes a single RF transmit antenna 120 and multiple RF receive antennas 148 positioned around the target area to enhance the identification and position of the detected material. By deploying multiple receive antennas, the system can triangulate the position of the target material with high precision. The processing module 194 analyzes the time-of-arrival and signal strength data from each receive antenna to determine the exact location and size of the material. This method allows the system to construct a detailed 3D map of the detected material, providing valuable spatial information for applications such as security screening or medical diagnostics.

In another embodiment, the system can determine if the detected material is composed of multiple portions or is a single homogeneous entity. When multiple RF receive antennas 148 are used, each antenna can capture different aspects of the signal response from various parts of the material. The processing module 194 compares the signal patterns received by each antenna. If discrepancies or variations in the signal are detected, the system can infer that the material is composed of multiple portions. This capability is particularly useful in detecting composite materials or contraband hidden within other objects. The directional shield 164 can be adjusted to focus the RF signals more precisely, enhancing the accuracy of the detection.

In another embodiment, the system can use the multiple RF receive antennas 148 to assess the density and composition of the detected material. By analyzing the signal attenuation and phase shift across different receive antennas, the processing module 194 can infer the density and material properties. This method is beneficial in applications such as geological surveys or material science research, where understanding the material composition is crucial. The directional shield 164 can be utilized to isolate specific signal paths, allowing for more detailed analysis and reducing the impact of environmental noise. The system may be utilized in various military applications, such as explosive ordnance disposal, where it could detect specific material signatures to locate and identify unexploded ordnance and landmines by tuning to detect common explosive materials and their unique resonant frequencies, enabling EOD teams to safely locate and disarm these threats. It may also be deployed for subsurface surveillance to detect underground structures or bunkers by scanning for reinforced materials or electronic components, providing crucial intelligence for detailed subsurface maps of enemy installations. In medical applications, the system may be use for tumor characterization may be enhanced by differentiating between benign and malignant tissue, recognizing specific cellular or molecular signatures unique to cancerous cells. The system may also monitor the efficacy of targeted cancer therapies by detecting changes in the molecular composition of tumor sites. In security applications, the system may be implemented at airports, border crossings, and other checkpoints to detect contraband such as drugs, explosives, or illegal wildlife products by identifying items based on their unique chemical signatures. It may also be used for crowd monitoring in public spaces to passively scan for weapons or explosive devices, enhancing security without causing disruptions. For infrastructure monitoring, the system may assess the structural integrity of infrastructure by detecting faults or degradation in materials, useful for bridges, tunnels, and buildings to prevent disasters by early detection of potential problems. It may be adapted for pipeline monitoring to detect leaks or weaknesses, crucial for both energy companies and environmental monitoring. In environmental monitoring, the system may detect specific pollutants in the air, water, or soil, valuable for ongoing monitoring and ensuring compliance with environmental regulations. It may also be used for wildlife and habitat monitoring by detecting specific biological materials or substances indicative of certain wildlife presence, aiding in species conservation and habitat assessment. In logistics and warehouse management, the system may verify the composition of goods in logistics hubs, ensuring hazardous or non-compliant materials are not shipped and assisting in sorting recyclable materials based on their composition.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A system for material detection and identification, the system comprising:
   an RF transmit device configured to transmit into an environment an RF signal at a resonance frequency;
   an RF receiver device configured to receive a response signal from the environment;
   a communication device connecting the RF transmit device and the RF receiver device, the communication device comprising a control module;
   a geolocation device; and
   a user interface configured to display a recommended location of the RF transmit device for determining a location of the material;
   the control module configured to:
     receive geolocation data from the geolocation device,
     analyze the response signal for resonance characteristics that indicate a presence of a material, and
     identify the material to a user when the presence of the material is indicated by the resonance characteristics.

2. The system of claim 1, wherein:
   the geolocation device is a first geolocation device is configured to provide geolocation data associated with transmitting the RF signal, and
   the system further comprises a second geolocation device configured to provide geolocation data associated with receiving the response signal.

3. The system of claim 2, wherein the communication device is configured to coordinate the RF transmit device and the RF receiver device to determine a location of the material.

4. The system of claim 1, wherein the communication device comprises memory storing a material database associating each material of a plurality of materials with one or more corresponding resonance frequencies.

5. The system of claim 1, wherein the geolocation data comprises time series data comprising locations at different points in time.

6. The system of claim 1, wherein the control module is further configured to determine a location of the material.

7. The system of claim 1, wherein the communication device comprises memory storing the geolocation data and previous geolocation data.

8. The system of claim 1, further comprising a user interface configured to display locations of the RF transmit device, the RF receiver device, and the material.

9. A method for material detection and identification, the method comprising:
   determining, by a control module, a resonance frequency for detecting a material;
   sending, by the control module, the resonance frequency to an RF transmit device;
   displaying, in a user interface, a recommended location of the RF transmit device for determining a location of the material;
   transmitting, using the RF transmit device, into an environment an RF signal at the resonance frequency;
   sending, by the control module, a request to an RF receiver device to receive a response signal;
   receiving, using the RF receiver device, the response signal from the environment;
   obtaining, by the control module, geolocation data of at least one of the RF transmit device and the RF receiver device;
   analyzing, by the control module, the response signal for resonance characteristics that indicate a presence of the material;
   identifying, by the control module, the material when the presence of the material is indicated by the resonance characteristics; and
   determining, by the control module, the location of the material using the geolocation data.

10. The method of claim 9, wherein obtaining the geolocation data comprises obtaining the geolocation data from the RF transmit device and the RF receiver device.

11. The method of claim 10, further comprising:
receiving first timestamp data of the transmitting,
receiving second timestamp data of the receiving, and
synchronizing transmission data from the RF transmit device with reception data from the RF receiver device using the first timestamp data and the second timestamp data.

12. The method of claim 10, further comprising storing the geolocation data in memory.

13. The method of claim 12, further comprising storing timestamp data of the RF signal and timestamp data of the response signal in the memory.

14. The method of claim 9, wherein obtaining the geolocation data comprises obtaining the geolocation data from the RF transmit device,
the method further comprising:
repositioning the RF transmit device to follow a pattern,
wherein determining the location of the material uses additional data gathered from the RF transmit device following the pattern.

15. The method of claim 14, wherein determining the location of the material uses triangulation.

16. The method of claim 9, wherein obtaining the geolocation data comprises obtaining the geolocation data from the RF receiver device at different points in time.

17. The method of claim 9, wherein:
the RF transmit device is a first RF transmit device,
the RF signal is a first RF signal,
the geolocation data is a first geolocation data, and
obtaining the geolocation data comprises obtaining the geolocation data of the first RF transmit device,
the method further comprising:
obtaining second geolocation data of a second RF transmit device, and
transmitting, using the second RF transmit device, into the environment a second RF signal,
wherein determining the location of the material comprises using the first geolocation data and the second geolocation data.

18. The method of claim 9, further comprising:
displaying, in a user interface, a dynamic geolocation map showing positions of the RF transmit device and the RF receiver device.

19. The method of claim 9, further comprising:
displaying, in a user interface, a dynamic geolocation map showing positions of detected materials.

* * * * *